United States Patent
Meng et al.

(10) Patent No.: US 12,298,999 B2
(45) Date of Patent: May 13, 2025

(54) DATABASE REPLICATION SYSTEM AND METHOD, SOURCE END DEVICE, AND DESTINATION END DEVICE

(71) Applicant: HUAWEI TECHNOLOGIES CO., LTD., Guangdong (CN)

(72) Inventors: Xiaozhen Meng, Shenzhen (CN); Jiantao Ma, Chengdu (CN); Kaiyao Huang, Dongguan (CN); Zhixue Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 17/894,352

(22) Filed: Aug. 24, 2022

(65) Prior Publication Data

US 2022/0405306 A1    Dec. 22, 2022

Related U.S. Application Data

(63) Continuation of application No. PCT/CN2021/077476, filed on Feb. 23, 2021.

(30) Foreign Application Priority Data

Feb. 28, 2020   (CN) .......................... 202010129105.2
May 8, 2020     (CN) .......................... 202010383462.1

(51) Int. Cl.
G06F 16/20      (2019.01)
G06F 16/23      (2019.01)
G06F 16/27      (2019.01)

(52) U.S. Cl.
CPC ........ G06F 16/273 (2019.01); G06F 16/2358 (2019.01)

(58) Field of Classification Search
CPC ..... G06F 16/2358; G06F 16/273; G06F 16/27
See application file for complete search history.

(56) References Cited

U.S. PATENT DOCUMENTS

| | | | |
|---|---|---|---|
| 7,725,423 B1 * | 5/2010 | Pricer | G06F 16/2477 707/600 |
| 9,727,625 B2 | 8/2017 | Bourbonnais et al. | |
| 10,664,465 B2 | 5/2020 | Lee et al. | |

(Continued)

FOREIGN PATENT DOCUMENTS

| | | |
|---|---|---|
| CN | 106777270 A | 5/2017 |
| CN | 107678888 A | 2/2018 |

(Continued)

*Primary Examiner* — Mahesh H Dwivedi

(57) ABSTRACT

In a database replication operation, a source end device obtains at least two groups of transaction logs from a log file of a source end database in parallel, where the at least two groups of transaction logs include a first group of transaction logs and a second group of transaction logs. The first group of transaction logs includes at least a first transaction log and a second transaction log that are adjacent to each other, and the second group of transaction logs includes at least a third transaction log and a fourth transaction log that are adjacent to each other, and a generation time point of the second transaction log is earlier than a generation time point of the third transaction log. The source end device then sends the at least two groups of transaction logs to a destination end device.

16 Claims, 20 Drawing Sheets

(56) References Cited

U.S. PATENT DOCUMENTS

| | | | |
|---|---|---|---|
| 2012/0023369 A1* | 1/2012 | Bourbonnais | G06F 16/2386 |
| | | | 714/E11.131 |
| 2015/0112934 A1 | 4/2015 | Quakkelaar et al. | |
| 2015/0199415 A1* | 7/2015 | Bourbonnais | G06F 16/27 |
| | | | 707/615 |
| 2016/0147617 A1 | 5/2016 | Lee et al. | |
| 2018/0144015 A1* | 5/2018 | Mittur Venkataramanappa | |
| | | | G06F 16/273 |
| 2018/0150496 A1* | 5/2018 | Kim | G06F 16/2365 |
| 2018/0150540 A1 | 5/2018 | Florendo et al. | |
| 2020/0401562 A1* | 12/2020 | Demoor | G06F 16/1865 |

FOREIGN PATENT DOCUMENTS

| | | |
|---|---|---|
| CN | 109189608 A | 1/2019 |
| KR | 101956236 B1 | 3/2019 |
| KR | 20190022600 A | 3/2019 |

\* cited by examiner

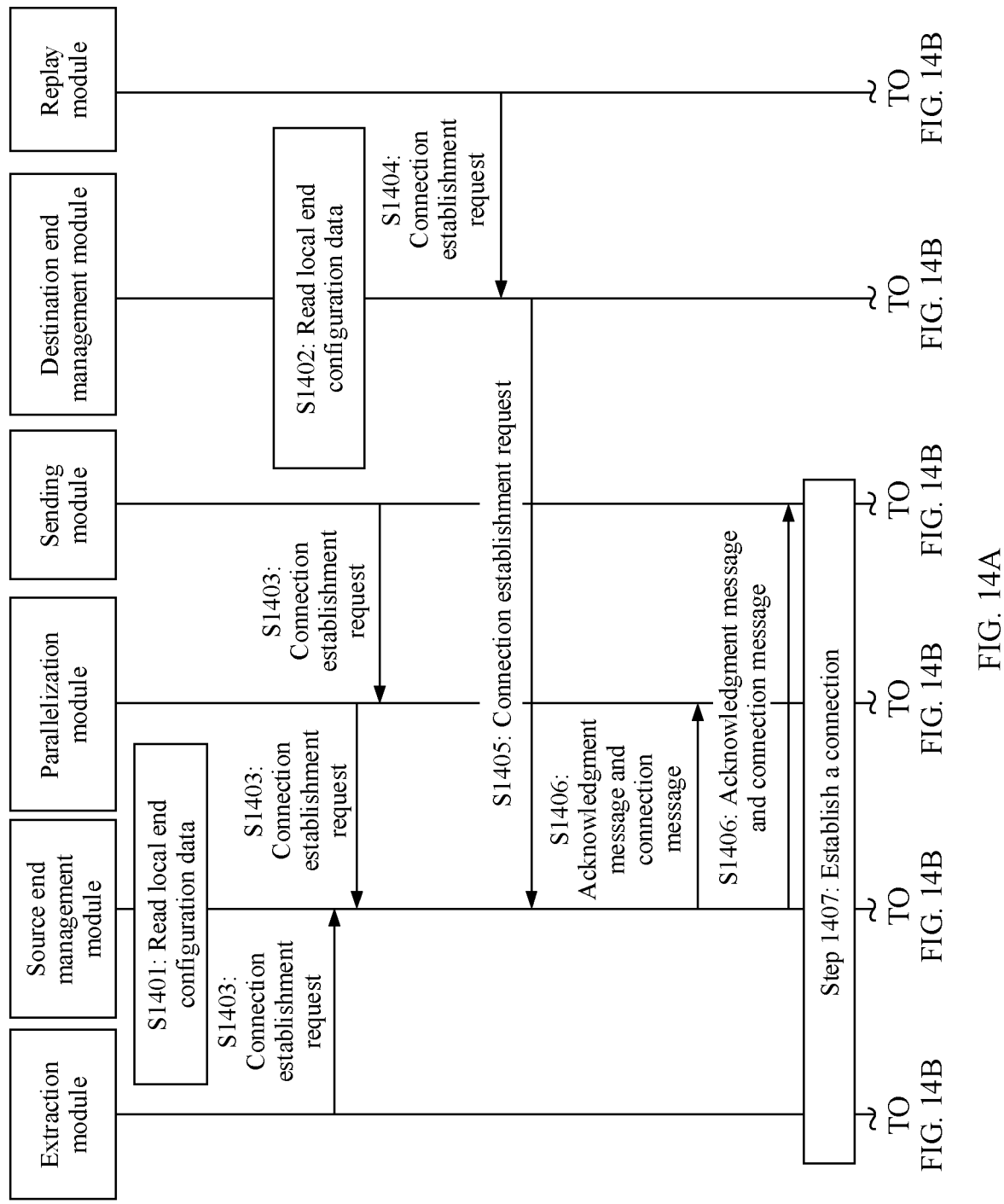

DATABASE REPLICATION SYSTEM AND METHOD, SOURCE END DEVICE, AND DESTINATION END DEVICE

CROSS-REFERENCE TO RELATED APPLICATIONS

This application is a continuation of International Application PCT/CN2021/077476 filed on Feb. 23, 2021, which claims priority to Chinese Patent Application 202010383462.1, filed on May 8, 2020, and Chinese Patent Application 202010129105.2, filed on Feb. 28, 2020. The disclosures of the aforementioned applications are hereby incorporated by reference in their entirety.

TECHNICAL FIELD

This application relates to the field of storage technologies, and in particular, to a data replication process in a storage system.

BACKGROUND

With development of technologies, increasingly more data needs to be stored in databases. Data in a source end database can be replicated to a destination end database usually by using a database replication solution, to ensure reliability of the data in the database, so that when the data in the source end database is faulty, the data existing before the fault can be recovered from the destination end database.

In an example, a transaction log-based database replication solution usually includes three phases: capturing changed data, transmitting the changed data, and replaying the changed data. Capturing the changed data refers to identifying changed data in the source end database by using a transaction log recorded in a log file of the source end database, and obtaining a transaction log corresponding to the changed data. Transmitting the changed data refers to transmitting the transaction log corresponding to the changed data from the source end database to the destination end database. Replaying the changed data refers to parsing and processing, in the destination end database, the received transaction log corresponding to the changed data, and updating the changed data to the destination end database.

A dependency relationship may exist between a plurality of transaction logs in the database, for example, a transaction log 1 needs to be replayed after replay of a transaction log 2 is completed. This is because the transaction log 1 and the transaction log 2 each record an operation performed on a same operation object in the source end database, for example, a write operation performed on a row primary key of a data table in the source end database, where a write operation that is recorded in the transaction log 1 and that is performed on the row primary key is performed before a write operation that is recorded in the transaction log 2 and that is performed on the row primary key. Therefore, in the database replication solution, in consideration of the foregoing dependency relationship, only serial processing can be performed on the transaction logs. For example, the transaction log 1 is first obtained from the log file of the source end database, and the transaction log 1 is sent to the destination end database. Then, the transaction log 2 is obtained from the log file of the source end database, and the transaction log 2 is sent to the destination end database. In the destination end database, the transaction log 1 is first replayed and then the transaction log 2 is replayed. Because an execution sequence needs to be strictly limited in a process of obtaining the transaction logs in the foregoing solution, efficiency of replicating the data by using the database replication solution is low. It can be learned that how to improve efficiency of replicating the data by using the database replication solution is a technical problem that needs to be urgently resolved currently.

SUMMARY

This application provides a database replication system and method, a source end device, and a destination end device, to improve efficiency of replicating data by using a database replication solution.

According to a first aspect, a database replication system is provided. The system is configured to perform replay in a destination end database based on at least two groups of transaction logs included in a log file of a source end database, and the system includes a source end device and a destination end device.

The source end device is configured to: obtain the at least two groups of transaction logs from the log file of the source end database in parallel, where the at least two groups of transaction logs include a first group of transaction logs and a second group of transaction logs, and send the at least two groups of transaction logs. For example, the first group of transaction logs includes at least a first transaction log and a second transaction log that are adjacent to each other, the second group of transaction logs includes at least a third transaction log and a fourth transaction log that are adjacent to each other, and a generation time point of the second transaction log is earlier than a generation time point of the third transaction log. "Being adjacent" may mean that generation time points of transaction logs are consecutive.

The destination end device is configured to: receive the at least two groups of transaction logs, and perform transaction replay in the destination end database of the destination end device based on the at least two groups of transaction logs. For example, the destination end device first performs transaction replay in the destination end database based on the first transaction log, the second transaction log, and a dependency relationship between the first transaction log and the second transaction log that are in the first group of transaction logs, and then performs transaction replay in the destination end database based on the third transaction log, the fourth transaction log, and a dependency relationship between the third transaction log and the fourth transaction log that are in the second group of transaction logs, so that data stored in the destination end database is the same as data stored in the source end database.

In the foregoing technical solution, before transaction logs in the source end database are sent to the destination end device, the transaction logs are grouped in a sequence of generation time points, to implement a process of obtaining and sending a plurality of groups of transaction logs in parallel, and improve processing efficiency of the database replication system. Further, because a dependency relationship between the transaction logs does not need to be considered before the transaction logs are replayed, centralized analysis and processing does not need to be performed on the transaction logs, so that processing complexity of the source end database can be reduced, and processing efficiency of the system can be improved. In addition, because different groups of transaction logs are replayed on the destination end device based on a dependency relationship between the transaction logs in a sequence of generation time points, accuracy of data obtained from the destination end database can be ensured, to ensure consistency between the data in the destination end database and data in the source end database.

In a possible design, the source end device is further configured to: record a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate the dependency relationship between the first transaction log and the second transaction log; and record a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate the dependency relationship between the third transaction log and the fourth transaction log.

In the foregoing technical solution, the source end device may record a dependency relationship between transaction logs in a corresponding transaction log, so that the destination end device can directly perform transaction log replay based on the dependency relationship recorded in each transaction log, to improve efficiency of performing a transaction log replay process.

In a possible design, the destination end device is further configured to: record a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate the dependency relationship between the first transaction log and the second transaction log; and record a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate the dependency relationship between the third transaction log and the fourth transaction log.

In the foregoing technical solution, after receiving transaction logs, the destination end device may determine a dependency relationship between the transaction logs, so that a processing amount of the source end device can be reduced, and efficiency of a process of extracting the transaction logs can be improved.

In a possible design, the first group of transaction logs and the second group of transaction logs are used as examples to describe a process in which the destination end device performs transaction log replay in the destination end database.

For the first group of transaction logs, when obtaining the second transaction log in the first group of transaction logs, the destination end device determines that the second transaction log records the number that is of the first transaction log and that is used to indicate the dependency relationship between the first transaction log and the second transaction log, and after determining that transaction replay performed based on the first transaction log is completed, performs transaction replay based on the second transaction log.

In the foregoing technical solution, the destination end device may determine, by determining whether a transaction log carries a number of another transaction log, whether there is a dependency relationship between the transaction log and the another transaction log. If there is the dependency relationship, the destination end device performs replay based on a transaction log only after replay of the transaction log on which the destination end device depends is completed, to ensure accuracy of data obtained from the destination end database.

In a possible design, when obtaining the first transaction log in the first group of transaction logs, the destination end device determines that the first transaction log does not record a number that is of a transaction log and that is used to indicate that there is a dependency relationship with the first transaction log, and performs transaction replay based on the first transaction log.

In the foregoing technical solution, if a transaction log does not include a number of another transaction log, the destination end device determines that there is no dependency relationship between the transaction log and the another transaction log, and may directly perform transaction replay based on the transaction log without waiting for the another transaction log.

For the second group of transaction logs, when obtaining the fourth transaction log in the second group of transaction logs, the destination end device determines that the fourth transaction log records the number that is of the third transaction log and that is used to indicate the dependency relationship between the fourth transaction log and the third transaction log, and after determining that transaction replay performed based on the third transaction log is completed, performs transaction replay based on the fourth transaction log.

In a possible design, when obtaining the third transaction log in the second group of transaction logs, the destination end device determines that the third transaction log does not record a number that is of a transaction log and that is used to indicate that there is a dependency relationship with the third transaction log, and performs transaction replay based on the third transaction log.

For a technical effect that can be implemented by replaying the second group of transaction logs, refer to the foregoing descriptions of the technical effect of replaying the first group of transaction logs. Details are not described herein again.

In a possible design, the source end device and the source end database are disposed in a first area, the destination end device and the destination end database are disposed in a second area, and the first area and the second area are remotely connected.

In the foregoing technical solution, the source end device and the destination end device may be disposed in different areas or different data centers, and then send transaction logs through a remote connection between the different areas or the different data centers. Certainly, the source end device and the destination end device may alternatively be disposed in a same area or a same data center. This is not limited herein.

In a possible design, the source end device is configured to obtain the at least two groups of transaction logs from the source end database in parallel based on a number range of transaction logs.

In the foregoing technical solution, the source end device may pre-allocate a corresponding number range of transaction logs to each group of transaction logs. In this case, the source end device may extract a transaction log based on each number range, to improve processing efficiency.

In a possible design, the source end device is further configured to: read log summary record information from the source end database, where the log summary record information records a number of a transaction log generated by the source end database, a recording location and a length that are of the transaction log in the log file, and a quantity of transaction logs in the log file; and then obtain the at least two groups of transaction logs from the log file in parallel based on the log summary record information.

In the source end database, storage locations of transaction logs in the log file may be noncontiguous. In this case, the source end database may store the log summary record information. Then, when the source end device needs to extract a transaction log, the source end device first reads the log summary record information in the source end database, finds, from the log summary record information, a record of the transaction log that needs to be extracted, and determines a storage location of the transaction log in the log file based on a location, a length, and a quantity in the record, so that the source end device can obtain the transaction log without traversing all transaction logs in the log file, to improve processing efficiency of the source end device.

According to a second aspect, a database replication method is provided. In the method, a source end device first obtains at least two groups of transaction logs from a log file of a source end database in parallel, where the at least two groups of transaction logs include a first group of transaction logs and a second group of transaction logs, and sends the at least two groups of transaction logs, where the first group of transaction logs includes at least a first transaction log and a second transaction log that are adjacent to each other, the second group of transaction logs includes at least a third transaction log and a fourth transaction log that are adjacent to each other, and a generation time point of the second transaction log is earlier than a generation time point of the third transaction log. Then, the source end device sends the at least two groups of transaction logs to a destination end device.

In a possible design, the source end device records a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate a dependency relationship between the first transaction log and the second transaction log; and records a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate a dependency relationship between the third transaction log and the fourth transaction log.

In a possible design, the source end device may obtain the at least two groups of transaction logs from the source end database in parallel based on a number range of transaction logs.

In a possible design, the source end device may first read log summary record information from the source end database, where the log summary record information records a number of a transaction log generated by the source end database, a recording location and a length that are of the transaction log in the log file, and a quantity of transaction logs in the log file. Then, the source end device obtains the at least two groups of transaction logs from the log file in parallel based on the log summary record information.

According to a third aspect, a database replication method is provided. In the method, a destination end device first receives at least two groups of transaction logs from a source end device, where the at least two groups of transaction logs include a first group of transaction logs and a second group of transaction logs, the first group of transaction logs includes at least a first transaction log and a second transaction log that are adjacent to each other, the second group of transaction logs includes at least a third transaction log and a fourth transaction log that are adjacent to each other, and a generation time point of the second transaction log is earlier than a generation time point of the third transaction log. Then, the destination end device performs transaction replay in a destination end database of the destination end device based on the at least two groups of transaction logs, so that data stored in the destination end database is the same as data stored in a source end database. For example, the destination end device performs transaction replay in the destination end database based on the first transaction log, the second transaction log, and a dependency relationship between the first transaction log and the second transaction log that are in the first group of transaction logs, and then performs transaction replay in the destination end database based on the third transaction log, the fourth transaction log, and a dependency relationship between the third transaction log and the fourth transaction log that are in the second group of transaction logs.

In a possible design, the destination end device records a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate the dependency relationship between the first transaction log and the second transaction log; and records a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate the dependency relationship between the third transaction log and the fourth transaction log.

In a possible design, when obtaining the first transaction log, the destination end device determines that the first transaction log does not record a number that is of a transaction log and that is used to indicate that there is a dependency relationship with the first transaction log, and performs transaction replay based on the first transaction log.

In a possible design, when obtaining the second transaction log, the destination end device determines that the second transaction log records the number that is of the first transaction log and that is used to indicate the dependency relationship between the first transaction log and the second transaction log, and after determining that transaction replay performed based on the first transaction log is completed, performs transaction replay based on the second transaction log.

In a possible design, when obtaining the third transaction log, the destination end device determines that the third transaction log does not record a number that is of a transaction log and that is used to indicate that there is a dependency relationship with the third transaction log, and performs transaction replay based on the third transaction log.

In a possible design, when obtaining the fourth transaction log, the destination end device determines that the fourth transaction log records the number that is of the third transaction log and that is used to indicate the dependency relationship between the fourth transaction log and the third transaction log, and after determining that transaction replay performed based on the third transaction log is completed, performs transaction replay based on the fourth transaction log.

According to a fourth aspect, a source end device is provided. The source end device includes a processing module and a sending module, and the modules may perform corresponding functions performed in any design example of the second aspect. Details are as follows:

The processing module is configured to: obtain at least two groups of transaction logs from a log file of a source end database in parallel, where the at least two groups of transaction logs include a first group of transaction logs and a second group of transaction logs, and send the at least two groups of transaction logs, where the first group of transaction logs includes at least a first transaction log and a second transaction log that are adjacent to each other, the second group of transaction logs includes at least a third transaction log and a fourth transaction log that are adjacent to each other, and a generation time point of the second transaction log is earlier than a generation time point of the third transaction log.

The sending module is configured to send the at least two groups of transaction logs to a destination end device.

In a possible design, the processing module is further configured to:

record a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate a dependency relationship between the first transaction log and the second transaction log; and record a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate a dependency relationship between the third transaction log and the fourth transaction log.

In a possible design, the processing module is specifically configured to:

obtain the at least two groups of transaction logs from the source end database in parallel based on a number range of transaction logs.

In a possible design, the processing module is specifically configured to:

read log summary record information from the source end database, where the log summary record information records a number of a transaction log generated by the source end database, a recording location and a length that are of the transaction log in the log file, and a quantity of transaction logs in the log file; and obtain the at least two groups of transaction logs from the log file in parallel based on the log summary record information.

According to a fifth aspect, a destination end device is provided. The destination end device includes a receiving module and a processing module, and the modules may perform corresponding functions performed in any design example of the third aspect. Details are as follows:

The receiving module is configured to receive at least two groups of transaction logs from a source end device, where the at least two groups of transaction logs include a first group of transaction logs and a second group of transaction logs, the first group of transaction logs includes at least a first transaction log and a second transaction log that are adjacent to each other, the second group of transaction logs includes at least a third transaction log and a fourth transaction log that are adjacent to each other, and a generation time point of the second transaction log is earlier than a generation time point of the third transaction log.

The processing module is configured to: perform transaction replay in a destination end database based on the first transaction log, the second transaction log, and a dependency relationship between the first transaction log and the second transaction log that are in the first group of transaction logs, and then perform transaction replay in the destination end database based on the third transaction log, the fourth transaction log, and a dependency relationship between the third transaction log and the fourth transaction log that are in the second group of transaction logs, so that data stored in the destination end database is the same as data stored in a source end database.

In a possible design, the processing module is further configured to:
record a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate the dependency relationship between the first transaction log and the second transaction log; and
record a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate the dependency relationship between the third transaction log and the fourth transaction log.

In a possible design, the processing module is specifically configured to:
when the first transaction log is obtained, determine that the first transaction log does not record a number that is of a transaction log and that is used to indicate that there is a dependency relationship with the first transaction log, and perform transaction replay based on the first transaction log.

In a possible design, the processing module is specifically configured to:
when the second transaction log is obtained, determine that the second transaction log records the number that is of the first transaction log and that is used to indicate the dependency relationship between the first transaction log and the second transaction log, and after determining that transaction replay performed based on the first transaction log is completed, perform transaction replay based on the second transaction log.

In a possible design, the processing module is specifically configured to:
when the third transaction log is obtained, determine that the third transaction log does not record a number that is of a transaction log and that is used to indicate that there is a dependency relationship with the third transaction log, and perform transaction replay based on the third transaction log.

In a possible design, the processing module is specifically configured to:
when the fourth transaction log is obtained, determine that the fourth transaction log records the number that is of the third transaction log and that is used to indicate the dependency relationship between the fourth transaction log and the third transaction log, and after determining that transaction replay performed based on the third transaction log is completed, perform transaction replay based on the fourth transaction log.

According to a sixth aspect, a source end device is provided. The source end device includes a processor, configured to implement the method according to the second aspect. The source end device may further include a memory, configured to store program instructions and data. The memory is coupled to the processor. The processor may invoke and execute the program instructions stored in the memory, to implement the method according to the second aspect. The source end device may further include a communications interface, and the communications interface is used by the source end device to communicate with another device. For example, the another device is a destination end device.

In a possible design, the source end device includes the processor and the communications interface.

The processor is configured to: obtain at least two groups of transaction logs from a log file of a source end database in parallel, where the at least two groups of transaction logs include a first group of transaction logs and a second group of transaction logs, and send the at least two groups of transaction logs, where the first group of transaction logs includes at least a first transaction log and a second transaction log that are adjacent to each other, the second group of transaction logs includes at least a third transaction log and a fourth transaction log that are adjacent to each other, and a generation time point of the second transaction log is earlier than a generation time point of the third transaction log.

The communications interface is configured to send the at least two groups of transaction logs to a destination end device.

In a possible design, the processor is further configured to:
record a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate a dependency relationship between the first transaction log and the second transaction log; and
record a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate a dependency relationship between the third transaction log and the fourth transaction log.

In a possible design, the processor is specifically configured to:

obtain the at least two groups of transaction logs from the source end database in parallel based on a number range of transaction logs.

In a possible design, the processor is specifically configured to:

read log summary record information from the source end database, where the log summary record information records a number of a transaction log generated by the source end database, a recording location and a length that are of the transaction log in the log file, and a quantity of transaction logs in the log file; and obtain the at least two groups of transaction logs from the log file in parallel based on the log summary record information.

According to a seventh aspect, a destination end device is provided. The destination end device includes a processor, configured to implement the method according to the third aspect. The destination end device may further include a memory, configured to store program instructions and data. The memory is coupled to the processor. The processor may invoke and execute the program instructions stored in the memory, to implement the method according to the third aspect. The destination end device may further include a communications interface, and the communications interface is used by the destination end device to communicate with another device. For example, the another device is a source end device.

In a possible design, the destination end device includes the processor and the communications interface.

The communications interface is configured to receive at least two groups of transaction logs from a source end device, where the at least two groups of transaction logs include a first group of transaction logs and a second group of transaction logs, the first group of transaction logs includes at least a first transaction log and a second transaction log that are adjacent to each other, the second group of transaction logs includes at least a third transaction log and a fourth transaction log that are adjacent to each other, and a generation time point of the second transaction log is earlier than a generation time point of the third transaction log.

The processor is configured to: perform transaction replay in a destination end database based on the first transaction log, the second transaction log, and a dependency relationship between the first transaction log and the second transaction log that are in the first group of transaction logs, and then perform transaction replay in the destination end database based on the third transaction log, the fourth transaction log, and a dependency relationship between the third transaction log and the fourth transaction log that are in the second group of transaction logs, so that data stored in the destination end database is the same as data stored in a source end database.

In a possible design, the processor is further configured to:

record a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate the dependency relationship between the first transaction log and the second transaction log; and record a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate the dependency relationship between the third transaction log and the fourth transaction log.

In a possible design, the processor is specifically configured to:

when the first transaction log is obtained, determine that the first transaction log does not record a number that is of a transaction log and that is used to indicate that there is a dependency relationship with the first transaction log, and perform transaction replay based on the first transaction log.

In a possible design, the processor is specifically configured to:

when the second transaction log is obtained, determine that the second transaction log records the number that is of the first transaction log and that is used to indicate the dependency relationship between the first transaction log and the second transaction log, and after determining that transaction replay performed based on the first transaction log is completed, perform transaction replay based on the second transaction log.

In a possible design, the processor is specifically configured to:

when the third transaction log is obtained, determine that the third transaction log does not record a number that is of a transaction log and that is used to indicate that there is a dependency relationship with the third transaction log, and perform transaction replay based on the third transaction log.

In a possible design, the processor is specifically configured to:

when the fourth transaction log is obtained, determine that the fourth transaction log records the number that is of the third transaction log and that is used to indicate the dependency relationship between the fourth transaction log and the third transaction log, and after determining that transaction replay performed based on the third transaction log is completed, perform transaction replay based on the fourth transaction log.

According to an eighth aspect, an embodiment of this application provides a computer-readable storage medium. The computer-readable storage medium stores a computer program, the computer program includes program instructions, and when the program instructions are executed by a computer, the computer is enabled to perform the method according to either of the second aspect and the third aspect.

According to a ninth aspect, an embodiment of this application provides a computer program product. The computer program product stores a computer program, the computer program includes program instructions, and when the program instructions are executed by a computer, the computer is enabled to perform the method according to either of the second aspect and the third aspect.

According to a tenth aspect, this application provides a chip system. The chip system includes a processor, and may further include a memory, to implement the method according to the second aspect or the third aspect. The chip system may include a chip, or may include a chip and another discrete component.

For beneficial effects of the second aspect to the tenth aspect and the implementations of the second aspect to the tenth aspect, refer to descriptions of beneficial effects of the system according to the first aspect and the implementations of the first aspect.

BRIEF DESCRIPTION OF DRAWINGS

FIG. 14A and FIG. 14B are a flowchart of performing initialization setting on modules according to an embodiment of this application;

DESCRIPTION OF EMBODIMENTS

Figure 1:
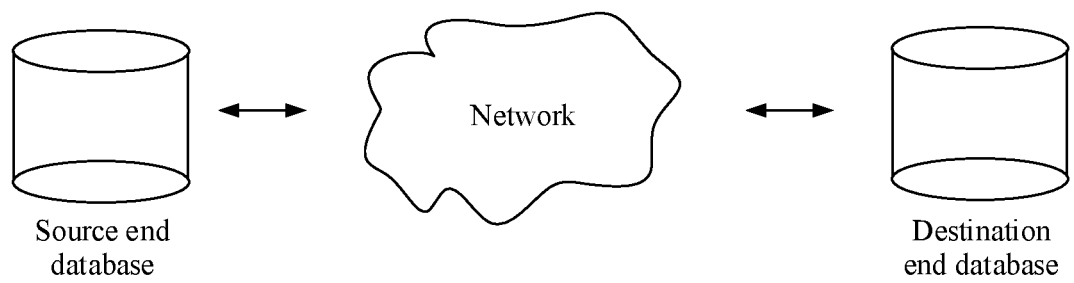
FIG. 1 is a schematic diagram of an example of an application scenario according to an embodiment of this application.

To make objectives, technical solutions, and advantages of the embodiments of this application clearer, the following further describes the embodiments of this application in detail with reference to the accompanying drawings.

To help a person skilled in the art understand the technical solutions provided in this application, the following describes technical terms in this application.

(1) Source end device: The source end device is a device configured to independently store data, for example, a server, or a device cluster configured to store data, for example, a storage system that includes a management device and a plurality of storage devices, where the management device may be a server, and the storage device may be a hard disk drive (HDD) disk device, a solid state drive (SSD) disk device, a serial advanced technology attachment (SATA) disk device, or the like.

A destination end device is similar to the source end device. Details are not described herein again.

(2) Source end database: The source end database refers to a set of a plurality of pieces of data that are stored in a specific storage manner and managed in a unified manner in a source end device. The source end device may perform operations such as addition, query, update, and deletion on the data in the database. Based on different storage manners, the source end database may include relational data or non-relational data, or certainly, may include another type of database. This is not limited herein. One source end device may include one source end database, or may include a plurality of source end databases. If the source end device includes the plurality of source end databases, the source end device may number each database. In this case, the source end device may access each source end database based on the number of each source end database.

A destination end database is similar to the source end database. Details are not described herein.

(3) Operation object: The operation object is each data stored in a source end database. For example, if the source end database stores data by using a data table, the operation object may be a row of data that is in any data table in the source end database and that is determined by a row primary key or a row unique key.

(4) Dependency relationship: The dependency relationship is a relationship in which a plurality of transaction logs generated for a same operation object in a source end database need to be replayed in a sequence of generation time points of the transaction logs. For example, at a first moment, a modification operation is performed on an operation object in the source end database to generate a transaction log 1, and at a second moment after the first moment, a modification operation is performed on the operation object again to generate a transaction log 2. In addition, because a generation time point of the transaction log 2 is later than a generation time point of the transaction log 1, the transaction log 2 needs to be replayed after the transaction log 1. In this case, a dependency relationship exists between the transaction log 1 and the transaction log 2. This may also mean that the transaction log 2 depends on the transaction log 1.

(5) Area: The area is a physical area in which power is independent of a network. Each area may be used to provide a corresponding computing resource, for example, a virtual machine, or each area may be used to provide a corresponding storage resource, for example, a storage system. This is not limited herein. When each area is used to provide a storage resource, the area may also be referred to as a data center. A remote connection between different areas or data centers may be performed, for example, through a wireless network.

(6) Generation time point of a transaction log: The generation time point is a logical time of the transaction log in a log file instead of a specific timestamp. The logical time may be understood as a sequence of a plurality of transaction logs. For example, a transaction log 1 is generated before a transaction log 2, but it cannot indicate that the transaction log is generated at a specific moment (for example, 10:39:00).

(7) Terms: In the embodiments of this application, "a plurality of" means two or more. In view of this, in the embodiments of this application, "a plurality of" may also be understood as "at least two". "At least one" may be understood as one or more, for example, understood as one, two, or more. For example, including at least one means including one, two, or more, and does not limit which is included. For example, including at least one of A, B, and C may represent the following cases: A is included, B is included, C is included, A and B are included, A and C are included, B and C are included, or A, B, and C are included. The term "and/or" describes an association relationship for describing associated objects and represents that three relationships may exist. For example, A and/or B may represent the following three cases: Only A exists, both A and B exist, and only B exists. In addition, the character "I" usually indicates an "or" relationship between the associated objects.

Unless otherwise stated, in the embodiments of this application, ordinal numbers such as "first" and "second" are intended to distinguish between a plurality of objects, and not intended to limit a sequence, a time sequence, a priority, or importance of the plurality of objects.

An application scenario in the embodiments of this application is first described.

With development of technologies such as big data analytics technologies and internet of things technologies, data has become a core factor for driving advancement of related technologies. Therefore, data in various industries needs to be stored for service analysis and guidance. For example, data may be stored by using a database storage system. The data in the storage system is usually replicated, to ensure data reliability. Referring to FIG. 1, an example in which a storage system is a database storage system is used. Data in a source end database may be replicated to a destination end database through a network, so that when the source end database is faulty, the data can be recovered from the destination end database. There are a plurality of solutions for replicating the data in the source end database to the destination end database through the network. For example, the data may be replicated based on an application layer, or the data may be replicated based on a database. In this embodiment of this application, a solution for replicating the data based on the database is mainly used, and may be briefly referred to as a database replication solution.

The following describes the database replication solution by using a transaction log-based database replication solution as an example.

When data stored in a source end database changes, transaction logs corresponding to the changed data are generated in the source end database. The transaction log may record information such as an operation performed on an operation object, content of the operation object, and start and end locations of the operation object. Specific content included in the transaction log is not limited herein. For example, at a moment 1, a new piece of data, for example, data A, is written to the source end database through a write operation, and in this case, the data A is the changed data in the source end database. Therefore, a transaction log corresponding to the data A is generated in the source end database and stored in a log file. The transaction log may record information such as an operation (in this example, the operation is the write operation) performed on the data A, content of the data A, and start and end locations of the data A. For ease of description, the transaction log corresponding to the data A is marked as a transaction log 1. Then, at a moment 2 after the moment 1, the data A is modified through a modification operation, and in this case, a transaction log 2 corresponding to the data A is generated again in the source end database and stored in the log file.

If the data in the source end database needs to be replicated to a destination end database, the transaction log-based database replication solution may be used. A major principle of the transaction log-based database replication solution is that when transaction logs are required to reach the destination end database, replay needs to be performed based on a dependency relationship between the transaction logs. For example, the foregoing transaction log 2 needs to be replayed after the transaction log 1, to obtain the same data as that in the source end database.

Figure 2:
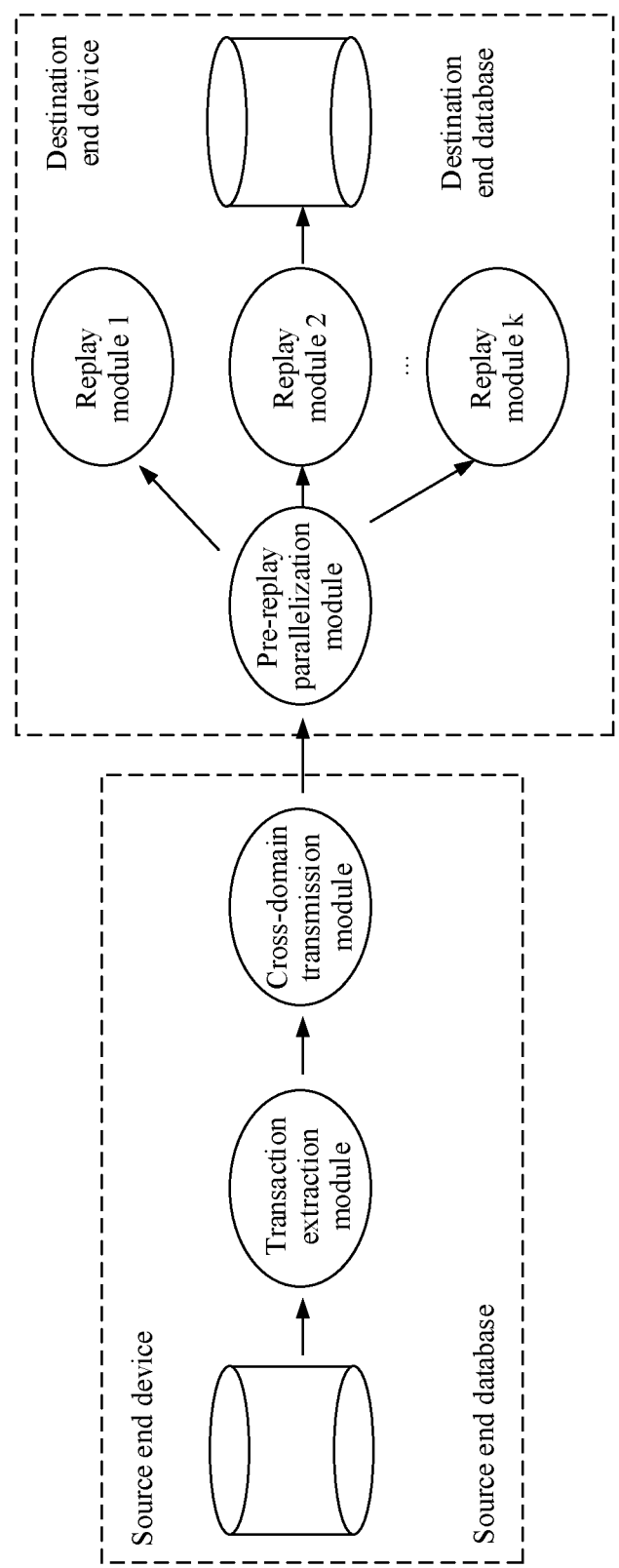
FIG. 2 is a schematic diagram of a transaction log-based database replication solution.

According to the foregoing principle, FIG. 2 is a schematic diagram of a transaction log-based database replication solution. As shown in FIG. 2, the database replication solution includes four modules: a transaction extraction module, a cross-domain transmission module, a pre-replay parallelization module, and a transaction replay module. The transaction extraction module and the cross-domain transmission module are disposed in a source end device, and the pre-replay parallelization module and the transaction replay module are disposed in a destination end device. The transaction extraction module, the cross-domain transmission module, and the pre-replay parallelization module are in a one-to-one relationship, and the pre-replay parallelization module and the transaction replay module are in a one-to-many relationship. To be specific, in the replication solution, there is one transaction extraction module, one cross-domain transmission module, and one pre-replay parallelization module, and there are a plurality of transaction replay modules. A specific value may be set based on an actual use requirement. In FIG. 2, an example in which K transaction replay modules are included is used.

The transaction extraction module in the source end device first obtains transaction logs corresponding to changed data in a source end database. Specifically, the transaction extraction module sequentially serially reads, in a sequence of generation time points of the transaction logs, the transaction logs from a log file that is of the source end database and that is used to store a transaction log, and then transmits the obtained transaction logs to the cross-domain transmission module for processing. After receiving the transaction logs, the cross-domain transmission module sequentially serially transmits the obtained transaction logs to the pre-replay parallelization module, to send the transaction logs corresponding to the changed data to the destination end device. It should be noted that, in the foregoing technical solution, that the transaction extraction module serially reads the transaction logs refers to sequentially serially reading the transaction logs from one log file corresponding to a source end database, where each source end database includes only one log file.

After receiving the plurality of transaction logs, the pre-replay parallelization module in the destination end device first identifies a dependency relationship between the plurality of transaction logs, and transmits the plurality of transaction logs to the transaction replay module based on the determined dependency relationship. For example, the pre-replay parallelization module may consider by default that a received $1^{st}$ transaction log does not depend on another transaction log, and in this case, transmit the $1^{st}$ transaction log to one of the K transaction replay modules, for example, transmit the $1^{st}$ transaction log to a transaction replay module 1. Then, the pre-replay parallelization module continues to determine whether a dependency relationship exists between a received $2^{nd}$ transaction log and the $1^{st}$ transaction log. If the pre-replay parallelization module determines that a same operation object in the source end database is processed for the $2^{nd}$ transaction log and the $1^{st}$ transaction log, the pre-replay parallelization module determines that the dependency relationship exists between the $2^{nd}$ transaction log and the $1^{st}$ transaction log. In this case, the pre-replay parallelization module transmits the $2^{nd}$ transaction log to the transaction replay module 1 only after the transaction replay module 1 completes replay of the $1^{st}$ transaction log. If the pre-replay parallelization module determines that the dependency relationship does not exist between the $2^{nd}$ transaction log and the $1^{st}$ transaction log, the pre-replay parallelization module directly transmits the $2^{nd}$ transaction log to a transaction replay module other than the transaction replay module 1 in the K transaction replay modules, for example, transmits the $2^{nd}$ transaction log to a transaction replay module 2. In this way, the transaction replay module 1 and the transaction replay module 2 may process different transaction logs in parallel, so that a process of performing parallel processing on transaction logs that do not have a dependency relationship can be implemented. After receiving the transaction logs, each transaction replay module executes the transaction logs in a target end database, and after completing the execution, the transaction replay module may obtain the changed data in the source end database. Then, the transaction replay module feeds back an execution result of the transaction log to the pre-replay parallelization module, so that the pre-replay parallelization module determines, based on whether an execution result of a transaction log is received, whether replay of the transaction log is completed.

It can be learned that, in the foregoing database replication solution, in a transaction replay phase, the plurality of transaction replay modules may be disposed to replay the transaction logs in parallel. In addition, in other processing phases, for example, a transaction extraction phase, a cross-domain transmission phase, and a pre-replay parallelization phase, only a serial processing manner can be used. Consequently, efficiency of replicating the data by using the database replication solution is low.

It can be learned from the foregoing process that because the dependency relationship between the transaction logs is considered, the transaction logs can only be serially processed before being replayed. However, if the changed data in the source end database needs to be obtained from the destination end database in a transaction log transmission manner, it only needs to ensure that the transaction logs are replayed based on a dependency relationship between the transaction logs when the transaction logs are replayed, and the dependency relationship may not be considered before the transaction logs are replayed. In this way, the plurality of transaction logs can be transmitted in parallel, to improve data replication efficiency.

In view of this, an embodiment of this application provides a database replication system that can improve data replication efficiency. The following describes, with reference to accompanying drawings, the database replication system provided in the embodiments of this application.

Figure 3:
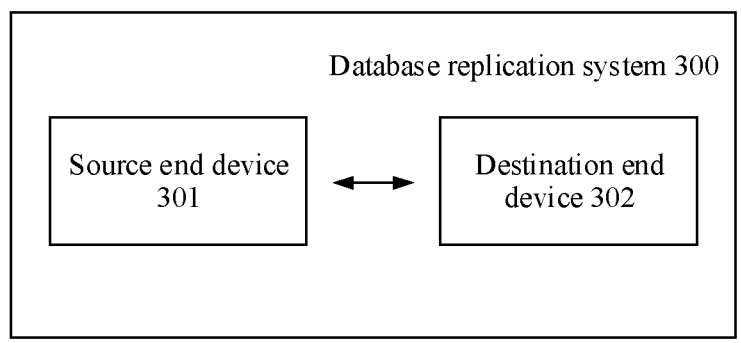
FIG. 3 is a structural block diagram of a database replication system 300 according to an embodiment of this application.

FIG. 3 is a structural block diagram of a database replication system 300 according to an embodiment of this application. The database replication system 300 is configured to perform replay in a destination end database based on at least two groups of transaction logs included in a log file of a source end database. As shown in FIG. 3, the database replication system 300 includes a source end device 301 and a destination end device 302 communicatively connected to the source end device 301.

The source end device 301 is configured to obtain the at least two groups of transaction logs from the log file of the source end database in parallel, where the at least two groups of transaction logs include a first group of transaction logs and a second group of transaction logs. Each group of transaction logs includes at least two transaction logs. For example, the first group of transaction logs includes at least a first transaction log and a second transaction log, and the second group of transaction logs includes at least a third transaction log and a fourth transaction log.

It should be noted that the transaction logs included in each group of transaction logs are adjacent, that is, the first transaction log is adjacent to the second transaction log, and the third transaction log is adjacent to the fourth transaction log. That the transaction logs are adjacent may mean that generation time points of the transaction logs in each group of transaction logs in the log file are consecutive. For example, each row in the log file is used to record one transaction log, and the source end device 301 stores the transaction logs in the log file based on generation time points of the transaction logs. In this case, the first transaction log and the second transaction log are stored in two consecutive rows in the log file, and the third transaction log and the fourth transaction log are stored in the other two consecutive rows in the log file. In addition, in this embodiment of this application, a generation time point of each transaction log in the first group of transaction logs is earlier than a generation time point of any transaction log in the second group of transaction logs. To be specific, a generation time point of a last transaction log in the first group of transaction logs is earlier than a generation time point of a $1^{st}$ transaction log in the second group of transaction logs. As described above, the first group of transaction logs includes the first transaction log and the second transaction log, and the second transaction log is the last transaction log that is in the first group of transaction logs and that is ranked based on a generation time point; and the second group of transaction logs includes the third transaction log and the fourth transaction log, and the third transaction log is the $1^{st}$ transaction log that is in the second group of transaction logs and that is ranked based on a time point. In this case, a generation time point of the second transaction log is earlier than a generation time point of the third transaction log.

In this embodiment of this application, a quantity of groups of transaction logs obtained by the source end device 301 in parallel is not limited. For example, three groups of transaction logs may be obtained in parallel, or five groups of transaction logs may be obtained in parallel. This is not limited herein. In this embodiment of this application, for ease of description, the system in this embodiment of this application is described below by using an example in which the source end device 301 obtains two groups of transaction logs in parallel, and respectively marks the two groups of transaction logs as the first group of transaction logs and the second group of transaction logs.

In addition, it should be noted that the source end device 301 may include at least one source end database, and the obtained at least two groups of transaction logs are obtained from a log file corresponding to a source end database, or may be obtained from log files corresponding to different source end databases. This is not limited herein.

After obtaining the first group of transaction logs and the second group of transaction logs, the source end device 301 sends the first group of transaction logs and the second group of transaction logs to the destination end device. It should be noted that the source end device 301 may send the first group of transaction logs and the second group of transaction logs in any manner, and may specifically send the first group of transaction logs and the second group of transaction logs in parallel or asynchronously. This is not limited herein.

The destination end device 302 is configured to: receive the first group of transaction logs and the second group of transaction logs, and then replay each group of transaction logs in the destination end database of the destination end device 302 based on at least two transaction logs included in each group of transaction logs and a dependency relationship between the transaction logs in each group of transaction logs, so that data stored in the destination end database is the same as data stored in the source end database.

Specifically, the generation time point of the last transaction log in the first group of transaction logs is earlier than the generation time point of the $1^{st}$ transaction log in the second group of transaction logs. Therefore, the destination end device 302 needs to first perform transaction replay in the destination end database based on the first transaction log, the second transaction log, and a dependency relationship between the first transaction log and the second transaction log that are in the first group of transaction logs, and then perform transaction replay in the destination end database based on the third transaction log, the fourth transaction log, and a dependency relationship between the third transaction log and the fourth transaction log that are in the second group of transaction logs.

In the foregoing technical solution, before transaction logs in the source end database are sent to the destination end device, the transaction logs are grouped in a sequence of generation time points, to implement a process of obtaining and sending a plurality of groups of transaction logs in parallel, and improve processing efficiency of the database replication system. Further, because a dependency relationship between the transaction logs does not need to be considered before the transaction logs are replayed, centralized analysis and processing does not need to be performed on the transaction logs, so that processing complexity of the source end database can be reduced, and processing efficiency of the system can be improved. In addition, because different groups of transaction logs are replayed on the destination end device based on a dependency relationship between the transaction logs in a sequence of generation time points, accuracy of data obtained from the destination end database can be ensured, to ensure consistency between the data in the destination end database and data in the source end database.

It should be noted that, in an actual use process, the source end device and the destination end device in the foregoing system may further process more groups of transaction logs in parallel, for example, process three groups of transaction logs and four groups of transaction logs in parallel. When more groups of transaction logs are obtained, a process of processing the plurality of groups of transaction logs by the source end device and the destination end device is the same as a process of processing the foregoing two groups of transaction logs.

In addition, in this embodiment of this application, the source end device and the source end database may be integrated into one device, or may be two independent devices, and the destination end device and the destination end database may be integrated into one device, or may be two independent devices. In addition, the source end device and the source end database may be disposed in a first area or a first data center, and the destination end device and the destination end database may be disposed in a second area or a second data center that is remotely connected to the first area or the first data center. Alternatively, the source end device, the source end database, the destination end device, and the destination end database may be disposed in a same area or a same data center. This is not limited herein.

The following describes specific implementations of the source end device 301 and the destination end device 302 in the database replication system 300 by using different examples.

Example 1

Figure 4:
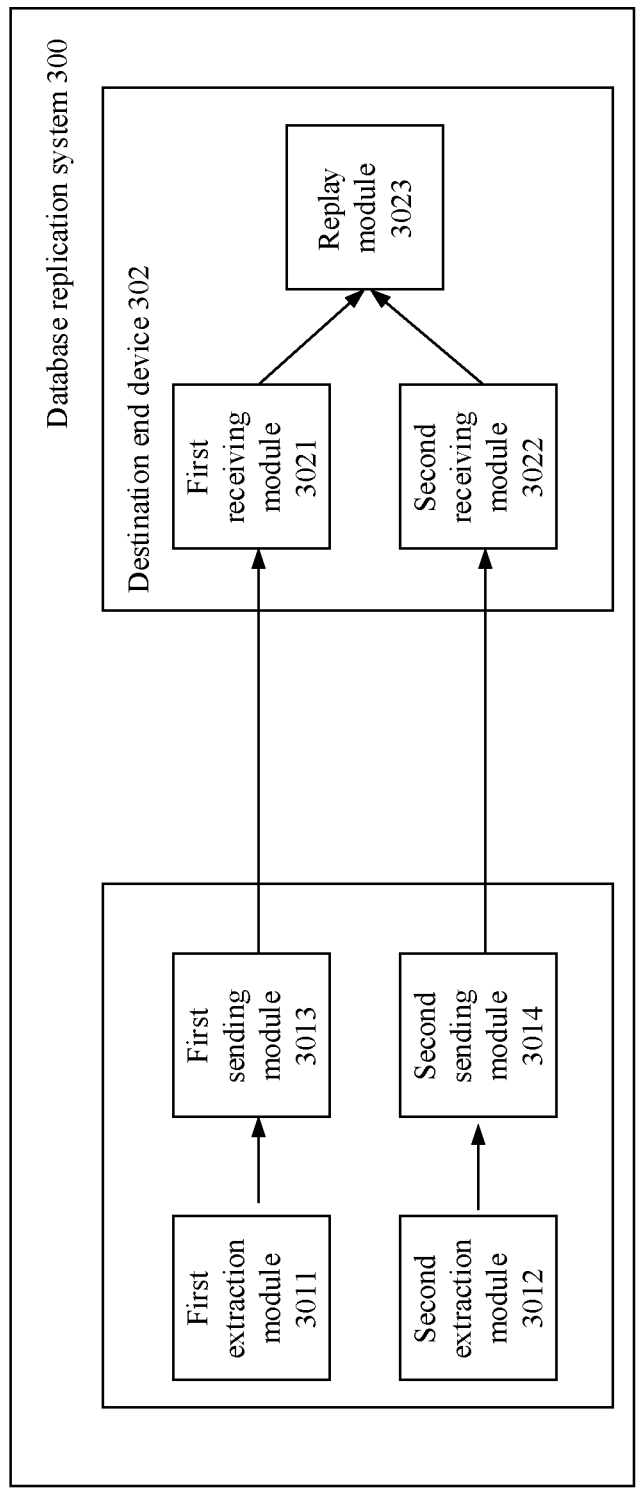
FIG. 4 is a structural block diagram of an example of the database replication system 300.

FIG. 4 is a structural block diagram of an example of the database replication system 300. As shown in FIG. 4, two extraction modules (which are respectively a first extraction module 3011 and a second extraction module 3012) and two sending modules (which are respectively a first sending module 3013 and a second sending module 3014) may be disposed in the source end device 301. The two extraction modules and the two sending modules are in a one-to-one connection relationship. For example, the first extraction module 3011 is connected to the first sending module 3013, and the second extraction module 3012 is connected to the second sending module 3014. Two receiving modules (which are respectively a first receiving module 3021 and a second receiving module 3022) and a replay module 3023 may be disposed in the destination end device 302. The two receiving modules and the two sending modules are in a one-to-one connection relationship. For example, the first sending module 3013 is connected to the first receiving module 3021, and the second sending module 3014 is connected to the second receiving module 3022. The two receiving modules are connected to the replay module 3023.

It should be noted that a quantity of extraction modules, a quantity of sending modules, and a quantity of receiving modules may be associated with a quantity of groups of transaction logs that need to be extracted by the source end device 301. For example, if the source end device 301 needs to obtain two groups of transaction logs, two extraction modules, two sending modules, and two receiving modules may be disposed. If the source end device 301 needs to obtain three groups of transaction logs, three extraction modules, three sending modules, and three receiving modules may be disposed, and by analogy. Details are not described herein.

Specifically, if the source end device 301 and the destination end device 302 are independent apparatuses, for example, may be independent servers, an extraction module, a sending module, a receiving module, and a replay module each may be a functional module, an application program, a thread, or the like implemented by program code in the server. If the source end device 301 and the destination end device 302 each are a cluster system, for example, a cluster system including at least one virtual machine, an extraction module, a sending module, a receiving module, and a replay module each may be a virtualization function instance, a container, or the like deployed on the virtual machine. Certainly, the foregoing modules may alternatively be implemented in another manner. This is not limited herein.

In this example, each extraction module is configured to obtain a group of transaction logs from a log file of the source end database. For example, the first extraction module 3011 is configured to obtain the first group of transaction logs from the log file, and the second extraction module 3012 is configured to obtain the second group of transaction logs from the log file. In this embodiment of this application, a manner in which the extraction module obtains the transaction log may include but is not limited to the following three manners:

Obtaining Manner 1:

Each extraction module first needs to determine an extraction range of a group of transaction logs that need to be extracted by the extraction module, and then obtain the first group of transaction logs and the second group of transaction logs based on respective extraction ranges.

The extraction range may be preset. For example, each row in the log file may be used to store a transaction log. Specifically, a row in the log file may be indicated by using a start identifier and an end identifier of a transaction log. In this case, the first extraction module 3011 permanently extracts transaction logs stored in rows 1 to 100 in the log file, and the second extraction module 3012 permanently extracts transaction logs stored in rows 101 to 200 in the log file. When determining that the transaction logs need to be extracted, each extraction module obtains the group of transaction logs from a corresponding location in the log file in parallel based on the preset extraction range. It should be noted that, a time point used to extract the transaction log may be set for each extraction module. For example, it may be specified that the transaction log starts to be extracted one hour after the source end device 301 is powered on. In this case, after running duration of the source end device 301 reaches one hour, each extraction module obtains each group of transaction logs in the foregoing manner.

Obtaining Manner 2:

Each extraction module obtains the first group of transaction logs and the second group of transaction logs from the source end database in parallel based on a number range of transaction logs.

Specifically, numbers of the transaction logs may be obtained by the extraction module through numbering in a sequence of generation time points of the transaction logs. For example, a number of a $1^{st}$ generated transaction log is 1, a number of a $2^{nd}$ generated transaction log is 2, and by analogy. In this case, a start number of a transaction log extracted by each extraction module and an extraction quantity of transaction logs may be preset. For example, each extraction module extracts 5000 transaction logs. In this case, a start number of a transaction log that needs to be extracted by the first extraction module 3011 is 1, and an extraction quantity is 5000, that is, transaction logs whose numbers are 1 to 5000 are extracted, and a start number of a transaction log that needs to be extracted by the second extraction module 3012 is 5001, and an extraction quantity is 5000, that is, transaction logs whose numbers are 5001 to 10000 are extracted. In this case, each extraction module obtains a group of transaction logs based on a preset number range. It should be noted that, in the foregoing example, descriptions are provided by using an example in which the start number of the transaction log is 1. In an actual use process, the start number of the transaction log may alternatively be 0. This is not limited herein.

Then, after determining a respective number range, each extraction module obtains a group of transaction logs from the source end database based on the number range. For example, each transaction log in a log file may include two parts: a header and a body. The header is used to record information such as a storage location of the transaction log. The body is used to record information such as a type of the transaction log, an operation corresponding to the transaction log, and content of processed data. Details are not described herein. The extraction module may sequentially read all transaction logs from the source end database. When reading a transaction log, the extraction module first determines a number of the transaction log based on a generation time point of the transaction log. If the number of the transaction log falls within a number range corresponding to the extraction module, the extraction module further reads a header of the transaction log and a body of the transaction log to obtain the transaction log; or if the number of the transaction log does not fall within a number range corresponding to the extraction module, the extraction module skips the transaction log and reads a next transaction log until the extraction module obtains all transaction logs corresponding to the number range, and finally obtains a group of transaction logs corresponding to the extraction module. In addition, after determining the number of the transaction log based on the generation time point of the transaction log, the extraction module may also add the number of the transaction log to the header of the transaction log after obtaining the transaction log.

In addition, it should be noted that after obtaining each transaction log, the extraction module may perform filtering on the transaction log, and then number a transaction log obtained after the filtering. For example, a filtering manner is: If the extraction module only needs to obtain a transaction log in a data table A, the extraction module may filter out a transaction log that does not belong to the data table A. Alternatively, the extraction module may perform filtering based on a type of a transaction log, for example, filter out a transaction log for creating a data table and a transaction log for modifying a data table structure. Specifically, there are a plurality of filtering manners. Details are not described herein.

However, in the source end database, storage locations of the transaction logs in the log file may be noncontiguous. For example, a transaction log 1 is stored in a first row of the log file, and a transaction log 2 is stored in a fourth row of the log file. In this case, each extraction module may need to traverse all transaction logs in the log file to obtain transaction logs corresponding to a number range corresponding to the extraction module.

Therefore, an obtaining manner 3 is provided, to further improve processing efficiency of the extraction module.

When storing the transaction log, the source end database of the source end device 301 may generate log summary record information corresponding to each transaction log, where the log summary record information records a number of a transaction log generated by the source end database, a recording location and a length that are of the transaction log in the log file, and a quantity of transaction logs in the log file. Certainly, other information may alternatively be included. Details are not described herein. It should be noted that the number that is of the transaction log and that is in the log summary record information is generated by the source end database. For example, the source end database may number the transaction log based on a generation time point of the transaction log. The log summary record information is stored at a specified location in the source end database. In this way, when the extraction module needs to obtain the transaction log, the extraction module may first obtain the log summary record information from the specified location, and then obtain the first group of transaction logs and the second group of transaction logs from the log file in parallel based on the log summary record information. For example, if the extraction module needs to obtain a transaction log numbered 2, the extraction module first obtains log summary record information in the source end database, finds a record of the transaction log numbered 2 from the log summary record information, determines a storage location of the transaction log numbered 2 in the log file based on a location, a length, and a quantity in the record, and then obtains a transaction log, that is, the transaction log numbered 2, from a corresponding location in the log file, so that the extraction module does not need to traverse all transaction logs in the log file, to improve processing efficiency of the extraction module.

It should be noted that, in the foregoing example, quantities of transaction logs included in extraction ranges corresponding to all extraction modules are the same. In an actual use process, quantities of transaction logs included in extraction ranges corresponding to different extraction modules may alternatively be different. For example, a $1^{st}$ extraction module may extract 5000 transaction logs, and a $2^{nd}$ extraction module may extract 4000 transaction logs. A person skilled in the art may set a quantity of transaction logs based on an actual use requirement. This is not limited herein.

It can be learned from the foregoing content that each transaction log may record a plurality of pieces of content, for example, which may include information such as a processed operation object, content of the operation object, and an amount of the operation object (which may be understood as data). It can be learned based on a purpose (that is, to obtain changed data in the source end database) of transmitting the transaction log in this embodiment of this application that not every piece of content included in the transaction log is necessary to obtain the changed data in the source end database. For example, even if the transaction log does not include the amount of the processed data, after the transaction log is replayed in the destination end database, corresponding data may still be obtained. Therefore, in this embodiment of this application, after obtaining the transaction log, each extraction module may further parse the transaction log, and perform filtering processing on each transaction log based on a preset filter condition to obtain a transaction log obtained after the filtering, so as to reduce a quantity of transmission resources occupied by the transmitted transaction log and improve transmission efficiency of the transaction log.

In an example, after obtaining the transaction log, the extraction module first parses the transaction log to obtain content included in the transaction log, filters out some content in the transaction log based on an operation type corresponding to the transaction log and a filter condition corresponding to each operation type, and then replicates and combines other content to obtain a transaction log obtained after the filtering. Filtering out some content may be understood as deleting some content. The operation type corresponding to the transaction log may include but is not limited to an operation type of adding data, an operation type of modifying data, an operation type of deleting data, an operation type of adding a database table, an operation type of deleting a database table, and the like. A person skilled in the art may set, based on actual use requirements, filter conditions corresponding to different operation types. For example, a filter condition corresponding to the operation type of adding data may be filtering out information other than a storage location of the processed data and content of the data. For another example, a filter condition corresponding to the operation type of deleting data may be filtering out information other than the processed operation object. In this way, different transaction logs can be flexibly filtered. The filter condition herein may be the same as or different from the condition that the extraction module performs filtering before numbering the transaction log. This is not limited herein.

Certainly, a structure of the transaction log may vary with a type of the source end database. For example, when the source end database uses a database A, the transaction log includes five fields, and when the source end database uses a database B, the transaction log includes seven fields. Therefore, each extraction module may adaptively support transaction logs corresponding to different types of databases, that is, each extraction module may correspond to a plurality of manners of parsing the transaction log, to ensure that content included in the transaction log can be accurately parsed. Before parsing the transaction log, the extraction module may first determine a type of the source end database, and then parse the transaction log in a parsing manner that matches the type of the source end database.

In addition, in this embodiment of this application, after each extraction module extracts a group of transaction logs, each extraction module may further automatically calculate an extraction range of a next group of transaction logs that need to be extracted. For example, a plurality of extraction modules may interact with each other, and each extraction module may obtain an extraction range corresponding to another module. For example, a number range corresponding to a $1^{st}$ extraction module 1 is 1 to 5000, and a quantity of transaction logs included in a number range that corresponds to another extraction module and that is obtained by the $1^{st}$ extraction module is 5000. In this case, the $1^{st}$ extraction module may deduce that a number range of a next group of transaction logs that need to be extracted is 20001 to 25000. Alternatively, each extraction module may preset a calculation policy. The calculation policy may be that after extracting a group of transaction logs, each extraction module automatically adds 20000 to a current number range to obtain a number range of a next group of transaction logs. In this way, the extraction module can extract the next group of transaction logs without waiting for the replay module to complete replay of the transaction logs extracted by the extraction module, to improve processing efficiency.

After obtaining a corresponding group of transaction logs, each of the first extraction module 3011 and the second extraction module 3012 sends the group of transaction logs obtained by each of the first extraction module 3011 and the second extraction module 3012 to a sending module connected to each of the first extraction module 3011 and the second extraction module 3012. For example, the first extraction module 3011 sends the obtained first group of transaction logs to the first sending module 3013, and the second extraction module 3012 sends the obtained second group of transaction logs to the second sending module 3014. Then, the first sending module 3013 sends the first group of transaction logs to the first receiving module 3021, and the second sending module 3014 sends the second group of transaction logs to the second receiving module 3022 in parallel.

After respectively receiving the first group of transaction logs and the second group of transaction logs, the first receiving module 3021 and the second receiving module 3022 send the first group of transaction logs and the second group of transaction logs to the replay module 3023. The replay module 3023 replays the two groups of transaction logs in the destination end database based on a dependency relationship between transaction logs.

In an example, the replay module 3023 first determines a dependency relationship between transaction logs included in the first group of transaction logs. For example, the replay module 3023 determines whether an operation object of a first transaction log in the first group of transaction logs is the same as an operation object of a second transaction log in the first group of transaction logs. If the operation object of the first transaction log in the first group of transaction logs is the same as the operation object of the second transaction log in the first group of transaction logs, the replay module 3023 determines whether a generation time point of the first transaction log is earlier than a generation time point of the second transaction log. If the generation time point of the first transaction log is earlier than the generation time point of the second transaction log, the replay module 3023 determines that the second transaction log depends on the first transaction log. In this case, the replay module 3023 first replays the first transaction log, and then replays the second transaction log, to ensure accuracy of data obtained from the destination end database. Specifically, the replay module 3023 may include a plurality of replay queues, and the replay module 3023 may group, based on a dependency relationship between transaction logs, a plurality of transaction logs included in the first group of transaction logs into the plurality of replay queues. For example, if a dependency relationship exists between the first transaction log and the second transaction log, the replay module 3023 groups the first transaction log and the second transaction log into a same replay queue. If no dependency relationship exists between each of other transaction logs and each of the first transaction log and the second transaction log, the replay module 3023 groups the other transaction logs into other replay queues until the replay module 3023 groups all transaction logs in the first group of transaction logs into corresponding replay queues, and then sequentially replays all transaction logs in each replay queue, to complete replay of the first group of transaction logs. The replay module 3023 determines, in the same manner as the foregoing manner, a dependency relationship between transaction logs included in the second group of transaction logs, and after replaying the first group of transaction logs, replays all transaction logs in the second group of transaction logs based on the dependency relationship between the transaction logs in the second group of transaction logs. A specific process is similar to the process of replaying the first group of transaction logs. Details are not described herein again.

It should be noted that one transaction log may include a plurality of transaction operations. For example, the plurality of transaction operations may include adding, modifying, and deleting data in different rows or different columns of different data tables. In other words, one transaction log may include a plurality of operation objects. In this case, when determining a dependency relationship between the transaction log and another transaction log, the replay module 3023 determines that the dependency relationship exists between the two transaction logs, provided that an operation object of the another transaction log is the same as one of the plurality of operation objects in the transaction log.

Figure 5:
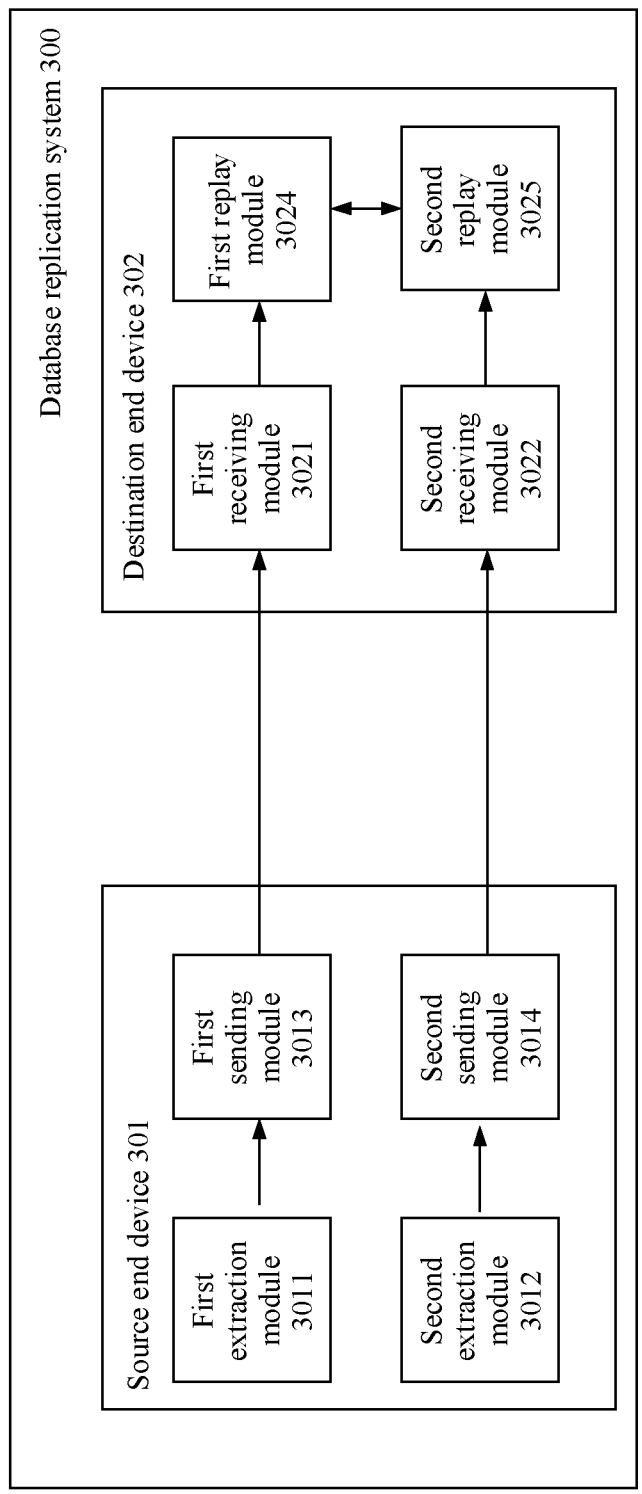
FIG. 5 is a structural block diagram of another example of the database replication system 300.

Certainly, in another embodiment, a plurality of replay modules may alternatively be included. FIG. 5 is a structural block diagram of another example of the database replication system 300. Different from the example in FIG. 4, in the example shown in FIG. 5, a quantity of replay modules may be the same as a quantity of receiving modules. For example, two replay modules are included, and are respectively a first replay module 3024 and a second replay module 3025. The first replay module 3024 is connected to the first receiving module 3021 and is configured to receive a first group of transaction logs, and the second replay module 3025 is connected to the second receiving module 3022 and is configured to receive a second group of transaction logs. Then, the first replay module 3024 and the second replay module 3025 replay, in a preset sequence, the transaction logs received by the first replay module 3024 and the second replay module 3025, where the preset sequence is that the first replay module 3024 first performs replay, and then the second replay module 3025 performs replay after the transaction logs in the first replay module 3024 are replayed. A manner in which each replay module replays a group of transaction logs received by the replay module is similar to a manner in which the replay module 3023 performs replay in FIG. 4. This is not limited herein.

It should be noted that, in the example shown in FIG. 5, the receiving module may alternatively be integrated into the replay module. For example, the first receiving module 3021 is integrated into the first replay module 3024, and the second receiving module 3022 is integrated into the second replay module 3025, to simplify the system.

Example 2

In addition to obtaining the first group of transaction logs and the second group of transaction logs in parallel, the source end device 301 in the database replication system 300 shown in FIG. 3 is further configured to provide a dependency relationship between a plurality of transaction logs included in each of the first group of transaction logs and the second group of transaction logs.

Specifically, for the first group of transaction logs, the source end device 301 records a number of a first transaction log in a second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number that is of the first transaction log and that is carried in the second transaction log is used to indicate a dependency relationship between the first transaction log and the second transaction log, that is, the second transaction log depends on the first transaction log.

For the second group of transaction logs, the source end device 301 records a number of a third transaction log in a fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number that is of the third transaction log and that is carried in the fourth transaction log is used to indicate a dependency relationship between the third transaction log and the fourth transaction log, that is, the fourth transaction log depends on the third transaction log.

In this case, the destination end device 302 may replay the plurality of transaction logs in each group of transaction logs based on whether each group of transaction logs carries numbers of other transaction logs.

Specifically, if the first transaction log does not include a number that is of a transaction log and that is used to indicate that there is a dependency relationship with the first transaction log, the destination end device 302 determines, when obtaining the first transaction log, to perform transaction replay based on the first transaction log. Then, when obtaining the second transaction log in the first group of transaction logs, the destination end device 302 determines that the second transaction log records the number that is of the first transaction log and that is used to indicate the dependency relationship between the first transaction log and the second transaction log, and after determining that transaction replay performed based on the first transaction log is completed, performs transaction replay based on the second transaction log, and by analogy until all transaction logs included in the first group of transaction logs are replayed. Then, when obtaining the third transaction log in the second group of transaction logs, the destination end device 302 determines that the third transaction log does not record a number that is of a transaction log and that is used to indicate that there is a dependency relationship with the third transaction log, and performs transaction replay based on the third transaction log. When obtaining the fourth transaction log in the second group of transaction logs, the destination end device 302 determines that the fourth transaction log records the number that is of the third transaction log and that is used to indicate the dependency relationship between the fourth transaction log and the third transaction log, and after determining that transaction replay performed based on the third transaction log is completed, performs transaction replay based on the fourth transaction log, and so on until all transaction logs included in the second group of transaction logs are replayed.

Figure 6:
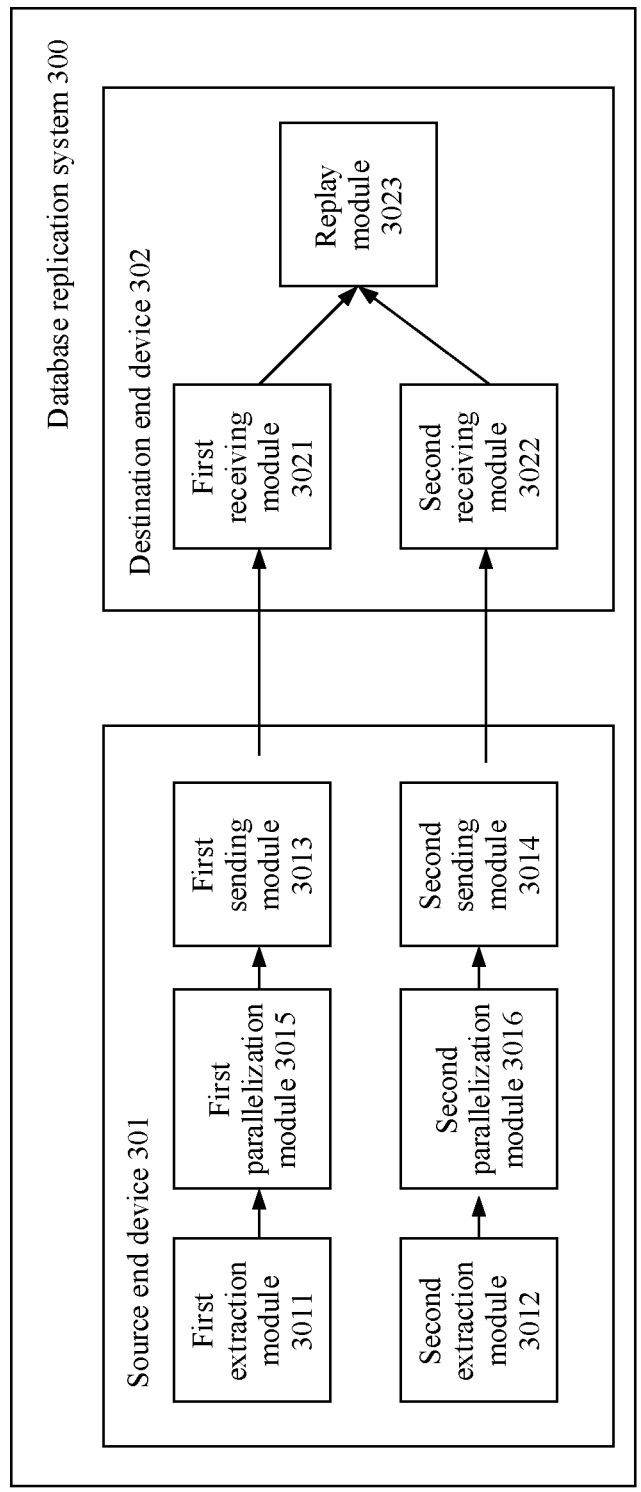
FIG. 6 is a structural block diagram of another example of the database replication system 300.

In this case, FIG. 6 is a structural block diagram of another example of the database replication system 300.

Different from the structure shown in FIG. 4, in this structure, two parallelization modules, which are respectively a first parallelization module 3015 and a second parallelization module 3016, are further disposed in the source end device 301. Each parallelization module is connected to an extraction module and a sending module. For example, the first parallelization module 3015 is connected to the first extraction module 3011 and the first sending module 3013, and the second parallelization module 3016 is connected to the second extraction module 3012 and the second sending module 3014. Each parallelization module is configured to: determine a dependency relationship between a plurality of transaction logs included in each group of transaction logs, and add the dependency relationship to a corresponding transaction log.

It should be noted that a quantity and implementations of parallelization modules are similar to those of the extraction module, the sending module, the receiving module, and the replay module. Details are not described herein again. In addition, the first extraction module 3011, the first sending module 3013, the second extraction module 3012, the second sending module 3014, the first receiving module 3021, the second receiving module 3022, and the replay module 3023 are respectively similar to the corresponding modules in FIG. 4. Details are not described herein again. In this example, the parallelization module is mainly described.

Specifically, after receiving a first group of transaction logs sent by the first extraction module 3011 connected to the first parallelization module 3015, the first parallelization module 3015 sequentially adds a dependency relationship to each transaction log in the group of transaction logs. The first parallelization module 3015 first obtains a $1^{st}$ transaction log in the first group of transaction logs. It is clear that the $1^{st}$ transaction log has no dependency relationship. Then, the first parallelization module 3015 may add a field to a header of the $1^{st}$ transaction log, where the field is used to indicate a number of a transaction log on which the transaction log depends. Because the $1^{st}$ transaction log has no dependency relationship, the field corresponding to the $1^{st}$ transaction log may be null, or the first parallelization module 3015 may write 0 to the field. In this case, a start number of the transaction log is 1. If the start number is 0, it indicates that the transaction log does not depend on another transaction log. Then, the first parallelization module 3015 determines a dependency relationship between a $2^{nd}$ transaction log and the $1^{st}$ transaction log in the first group of transaction logs, and determines whether an operation object of a transaction operation recorded in the $2^{nd}$ transaction log in the source end database is the same as an operation object of a transaction operation recorded in the previous transaction log in the source end database. For example, if the first parallelization module 3015 determines that the transaction operation recorded in the $1^{st}$ transaction log is used to process a first row of data in a data table A, and the transaction operation recorded in the $2^{nd}$ transaction log is also used to process the first row of data in the data table A, the first parallelization module 3015 determines that the transaction operations respectively recorded in the $1^{st}$ transaction log and the $2^{nd}$ transaction log have a same operation object in the source end database. Alternatively, when the source end database is a KV (key-value) database, the first parallelization module 3015 may determine, by determining whether the operation objects recorded in the two transaction logs have at least one same key value, whether the transaction operations respectively recorded in the two transaction logs have a same operation object in the source end database. If a same key value exists, it indicates that the transaction operations respectively recorded in the two transaction logs have the same operation object in the source end database. If no same key value exists, it indicates that the transaction operations respectively recorded in the two transaction logs have different operation objects in the source end database. Certainly, determining may alternatively be performed in another manner. This is not limited herein.

Then, the first parallelization module 3015 determines whether an operation moment of the transaction operation recorded in the $1^{st}$ transaction log in the source end database (which may be understood as a generation time point of the $1^{st}$ transaction log in a log file) is earlier than an operation moment of the transaction operation recorded in the $2^{nd}$ transaction log in the source end database (which may be understood as a generation time point of the $2^{nd}$ transaction log in the log file). If the operation moment of the transaction operation recorded in the $1^{st}$ transaction log in the source end database is earlier than the operation moment of the transaction operation recorded in the $2^{nd}$ transaction log in the source end database, it indicates that the $2^{nd}$ transaction log depends on the $1^{st}$ transaction log, and a number of the $1^{st}$ transaction log is added to a newly added field in a header of the $2^{nd}$ transaction log. Subsequently, the first parallelization module 3015 continues to determine whether a dependency relationship exists between a $3^{rd}$ transaction log and each of the $1^{st}$ transaction log and the $2^{nd}$ transaction log in the first group of transaction logs. A specific determining manner is similar to the foregoing manner of determining the dependency relationship between the $2^{nd}$ transaction log and the $1^{st}$ transaction log. Details are not described herein again. If the first parallelization module 3015 determines that the dependency relationship exists between the $3^{rd}$ transaction log and each of the $1^{st}$ transaction log and the $2^{nd}$ transaction log, the first parallelization module 3015 adds a number of the $1^{st}$ transaction log and a number of the $2^{nd}$ transaction log to a newly added field in a header of the $3^{rd}$ transaction log. In the foregoing same manner, the first parallelization module 3015 determines a dependency relationship between each transaction log and a previous transaction log in the group of transaction logs, adds the determined dependency relationship to a corresponding transaction log, to obtain a group of transaction logs including the dependency relationship, and then sends the transaction log including the dependency relationship to the first sending module 3013. The first sending module 3013 sends the transaction log including the dependency relationship to the replay module 3023 in the destination end device 302.

It should be noted that, after processing a group of transaction logs, each parallelization processing module may first cache the processed transaction logs locally, then create a processing queue, and receive and process another group of transaction logs sent by an extraction module connected to the parallelization processing module, without waiting for the processed transaction logs to be successfully transmitted to the destination end database, so that processing efficiency of the parallelization processing module can be improved.

In addition, it can be learned from the foregoing content that, when performing replay based on the transaction log, the replay module can perform replay based on the second group of transaction logs only after completing replay of the first group of transaction logs. Therefore, to help the replay module distinguish between different groups of transaction logs, the parallelization processing module may also add a new field to a header of each transaction log, to indicate information about a group to which the transaction log belongs. For example, if a first transaction log and a second transaction log belong to the first group of transaction logs, a number 1 is added to headers of the first transaction log and the second transaction log; and if a third transaction log and a fourth transaction log belong to the second group of transaction logs, a number 2 is added to headers of the third transaction log and the fourth transaction log.

In addition, it can be learned from the foregoing descriptions of the extraction module that after extracting a group of transaction logs, each extraction module may further automatically calculate an extraction range of a next group of transaction logs that need to be extracted. For example, after extracting transaction logs whose number range is 1 to 5000, a $1^{st}$ extraction module 1 does not need to wait for completion of replay of the transaction logs, and after determining that a number range of a next group of transaction logs that need to be extracted is 20001 to 25000, may extract the transaction logs whose number range is 20001 to 25000. It is clear that the transaction logs whose number range is 20001 to 25000 are also transaction logs that belong to a group 1. The parallelization processing module may further add, to the transaction log, an identifier used to display a quantity of extraction times, to help distinguish the transaction logs whose number range is 1 to 5000 from the transaction logs whose number range is 20001 to 25000. For example, if the transaction logs whose number range is 1 to 5000 are transaction logs in a transaction log group that are extracted by the extraction module 1 for the first time, a number 11 may be added to each transaction log. A $1^{st}$ number 1 is used to indicate that the transaction log is extracted for the first time, and a $2^{nd}$ number is used to indicate that a group to which the transaction log belongs is a first group. Certainly, a $1^{st}$ number 1 may alternatively be used to indicate a group to which the transaction log belongs, and a $2^{nd}$ number 1 is used to indicate that the transaction log is extracted for the first time. This is not limited herein. If the transaction logs whose number range is 20001 to 25000 are transaction logs in a transaction log group that are extracted by the extraction module 1 for the second time, a number 21 may be added to each transaction log, where a $1^{st}$ number 2 is used to indicate that the transaction log is extracted for the second time, and a $2^{nd}$ number is used to indicate that a group to which the transaction log belongs is a first group, or a number 12 may be added, where a $1^{st}$ number 1 is used to indicate a group to which the transaction log belongs, and a $2^{nd}$ number 2 is used to indicate that the transaction log is extracted for the second time. In this way, after receiving the transaction log, the replay module first executes the transaction log extracted by each extraction module for the first time, then executes the transaction log extracted for the second time, and so on.

Example 3

Figure 7:
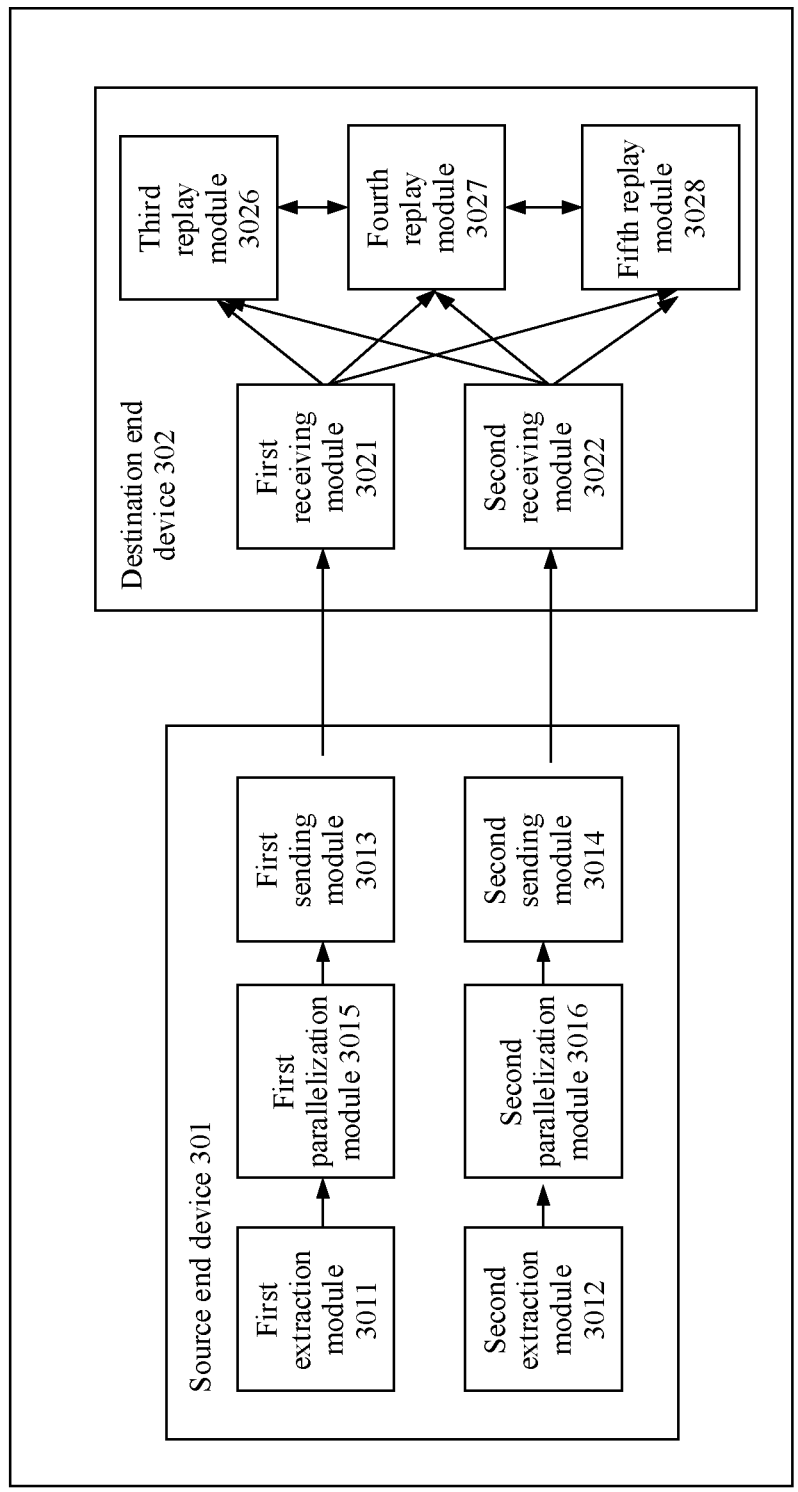
FIG. 7 is a structural block diagram of another example of the database replication system 300.

FIG. 7 is a structural block diagram of another example of the database replication system 300.

Different from the structure shown in FIG. 6, in this structure, there may be a plurality of replay modules in the destination end device 302, and a quantity of replay modules may be different from a quantity of receiving modules. For example, in FIG. 7, three replay modules are included: a third replay module 3026, a fourth replay module 3027, and a fifth replay module 3028.

Each replay module is connected to the first receiving module 3021 and the second receiving module 3022. To be specific, each receiving module may send a transaction log to any one of the replay modules, and each replay module may be configured to receive transaction logs from different groups.

In a first example, each receiving module may randomly distribute each transaction log in a received group of transaction logs to any replay module.

In a second example, each receiving module may distribute each transaction log in a received group of transaction logs to the replay module in a preset sequence. For example, the first receiving module 3021 distributes a $1^{st}$ transaction log in the received first group of transaction logs to the third replay module 3026, distributes a $2^{nd}$ transaction log in the first group of transaction logs to the fourth replay module 3027, distributes a $3^{rd}$ transaction log to the fifth replay module 3028, distributes a $4^{th}$ transaction log to the third replay module 3026, distributes a $5^{th}$ transaction log to the fourth replay module 3027, distributes a $6^{th}$ transaction log to the fifth replay module 3028, and so on.

In a third example, each receiving module may number each replay module. For example, a number of the third replay module 3026 is 1, a number of the fourth replay module 3027 is 2, and a number of the fifth replay module 3028 is 3. According to a load balancing principle, each receiving module may perform hash calculation based on a number of each transaction log, to learn that a hash calculation result is a number of a replay module to which each transaction log needs to be distributed, so that each receiving module distributes the transaction log to the corresponding replay module. For example, if the $1^{st}$ transaction log in the first group of transaction logs is a transaction log 1, the first receiving module 3021 performs hash calculation on the number 1 to obtain a calculated value. For example, if the calculated value is 1, it indicates that the transaction log 1 needs to be distributed to a replay module whose number is 1. In this case, the first receiving module 3021 distributes the transaction log 1 to the third replay module 3026, and so on until the first receiving module 3021 completes distribution of all received transaction logs to the replay modules.

It should be noted that, in the foregoing examples, when distributing a received group of transaction logs to a plurality of replay modules, the receiving module may further use each transaction log to carry an identifier of a transaction log group to which the transaction log belongs. For example, each transaction log in the first group of transaction logs carries an identifier of a first group, each transaction log in the second group of transaction logs carries an identifier of a second group, and so on. Details are not described herein.

After receiving the transaction logs sent by each receiving module, each replay module caches the transaction logs in different replay queues to wait for replay. Specifically, one replay module may be provided with a plurality of replay queues, and these replay queues respectively cache transaction logs sent by different receiving modules. For example, in this example, if there are two receiving modules, each replay module may include two replay queues, and cache, in different replay queues in a sequence of generation time points of transaction logs received from each receiving module, the transaction logs sent by the different receiving modules. For example, the third replay module 3026 sequentially caches the transaction logs received from the first receiving module 3021 in a $1^{st}$ replay queue, and sequentially caches the transaction logs received from the second receiving module 3022 in a $2^{nd}$ replay queue. A processing manner of another replay module is the same as a processing manner of the third replay module 3026. Details are not described herein again. Alternatively, a plurality of replay queues may be set to be associated with different groups of transaction logs. For example, all transaction logs in the first group of transaction logs are cached in a $1^{st}$ replay queue, and all transaction logs in the second group of transaction logs are cached in a $2^{nd}$ replay queue. In this way, the transaction logs can be replayed based on the different replay queues.

Then, each replay module sequentially replays transaction logs in different queues in a sequence of the replay queues. For example, the third replay module 3026 first processes the transaction logs in the $1^{st}$ replay queue, and after replaying all the transaction logs in the queue, replays all the transaction logs in the $2^{nd}$ replay queue. A processing manner of another replay module is also the same as a processing manner of the third replay module 3026. Details are not described herein again.

Each replay module replays a $1^{st}$ transaction log that is waiting to be processed by the replay module when determining that the $1^{st}$ transaction log meets a replay condition. The $1^{st}$ transaction log that is waiting to be processed may be understood as a $1^{st}$ transaction log that is in a replay queue being processed by the replay module and that is waiting to be processed. For example, the third replay module 3026 first processes the transaction logs in the $1^{st}$ replay queue, where a $1^{st}$ transaction log in the $1^{st}$ replay queue is the $1^{st}$ transaction log in the first group of transaction logs, and then the third replay module 3026 determines whether the $1^{st}$ transaction log depends on another transaction log. For example, the third replay module 3026 determines that the $1^{st}$ transaction log does not carry a number of another transaction log in the first group of transaction logs, and therefore determines that the first transaction log does not depend on the another transaction log. If the third replay module 3026 determines that the $1^{st}$ transaction log meets a replay condition, the third replay module 3026 performs replay in the destination end database based on the $1^{st}$ transaction log. A specific replay process is similar to that in the example shown in FIG. 2. This is not limited herein. After replaying the $1^{st}$ transaction log, the third replay module 3026 sends a replay result to another replay module, that is, sends the relay result to the fourth replay module 3027 and the fifth replay module 3028, where the replay result is that replay of the 1st transaction log is completed.

When the third replay module 3026 processes the transaction logs in the $1^{st}$ replay queue in the third replay module 3026, the fourth replay module 3027 and the fifth replay module 3028 also process transaction logs in respective $1^{st}$ replay queues in parallel. However, because a $1^{st}$ transaction log that is waiting to be processed in the $1^{st}$ replay queue in the fourth replay module 3027 is the $2^{nd}$ transaction log in the first group of transaction logs, the fourth replay module 3027 determines that the $2^{nd}$ transaction log depends on the $1^{st}$ transaction log in the first group of transaction logs. Therefore, the fourth replay module 3027 cannot replay the transaction log before the fourth replay module 3027 receives, from another replay module, a replay result that replay of the $1^{st}$ transaction log in the first group of transaction logs is completed. The same is true of the fifth replay module 3028. To be specific, at a same moment, only one of the plurality of replay modules is replaying the transaction log, and other replay modules are in a waiting state.

After the fourth replay module 3027 receives a replay result that is of the $1^{st}$ transaction log in the first group of transaction logs and that is sent by the third replay module 3026, the fourth replay module 3027 determines that the replay result is exactly a replay result of a transaction log on which a transaction log (that is, the $2^{nd}$ transaction log in the first group of transaction logs) that is waiting to be processed by the fourth replay module 3027 depends. If the fourth replay module 3027 determines that the transaction log that is waiting to be processed by the fourth replay module 3027 meets a replay condition, the fourth replay module 3027 performs replay in the destination end database based on the transaction log, and sends a replay result of the $2^{nd}$ transaction log to the third replay module 3026 and the fifth replay module 3028.

After the fifth replay module 3028 receives a replay result that is of the $1^{st}$ transaction log in the first group of transaction logs and that is sent by the third replay module 3026, the fifth replay module 3028 determines that a transaction log that is waiting to be processed by the fifth replay module 3028 is the $4^{th}$ transaction log in the first group of transaction logs, where the $4^{th}$ transaction log depends on the $2^{nd}$ transaction log and the $3^{rd}$ transaction log, and the replay result is not a replay result of a transaction log on which the transaction log that is waiting to be processed by the fifth replay module 3028 depends. Therefore, the fifth replay module 3028 continues remaining a waiting state, and does not start replay until the fifth replay module 3028 receives replay results of the $2^{nd}$ transaction log and the $3^{rd}$ transaction log in the first group.

It should be noted that, when the fourth replay module 3027 and the fifth replay module 3028 do not respectively receive, within preset duration, the replay results of the transaction logs on which the transaction logs that are waiting to be processed by the fourth replay module 3027 and the fifth replay module 3028 depend, the fourth replay module 3027 and the fifth replay module 3028 each may send, to another replay module, a query request used to obtain the replay result, and the replay module that executes the transaction log responds to the query request, where a response result is whether replay of the transaction log is completed. In this way, the fourth replay module 3027 and the fifth replay module 3028 may determine, based on the response result, whether the fourth replay module 3027 and the fifth replay module 3028 need to continue remaining the waiting state.

In the foregoing process, after the three replay modules replay the transaction logs in all the replay queues, the same data as that in the source end database is obtained in the destination end database.

In this embodiment of this application, each sending module may further include a cache unit, configured to cache a transaction log that is not sent to the receiving module, to ensure transmission reliability of the transaction log. The source end device 301 may clear a transaction log whose storage duration exceeds a threshold in the log file. However, when an exception occurs in transmission between the sending module and the receiving module, for example, transmission is interrupted, the sending module may use the cache unit to store the transaction log that is not sent to the receiving module, so that the sending module re-sends the transaction log to the receiving module after transmission is resumed. Alternatively, the sending module may use another manner to ensure transmission reliability of the transaction log. For example, the sending module may directly store, in a permanent storage device, the transaction log that is not sent to the receiving module. This is not limited herein.

In addition, each sending module may simultaneously create a plurality of processing queues. Each processing queue is configured to: process a group of transaction logs received from a parallelization module, and sequentially send transaction logs in each processing queue to the receiving module in a preset processing sequence. The processing queues may be independently executed. To be specific, when not all transaction logs in one processing queue are sent to the receiving module, another processing queue receives a next group of transaction logs from a parallelization module connected to the another processing queue, to reduce a transmission waiting delay.

Figure 8:
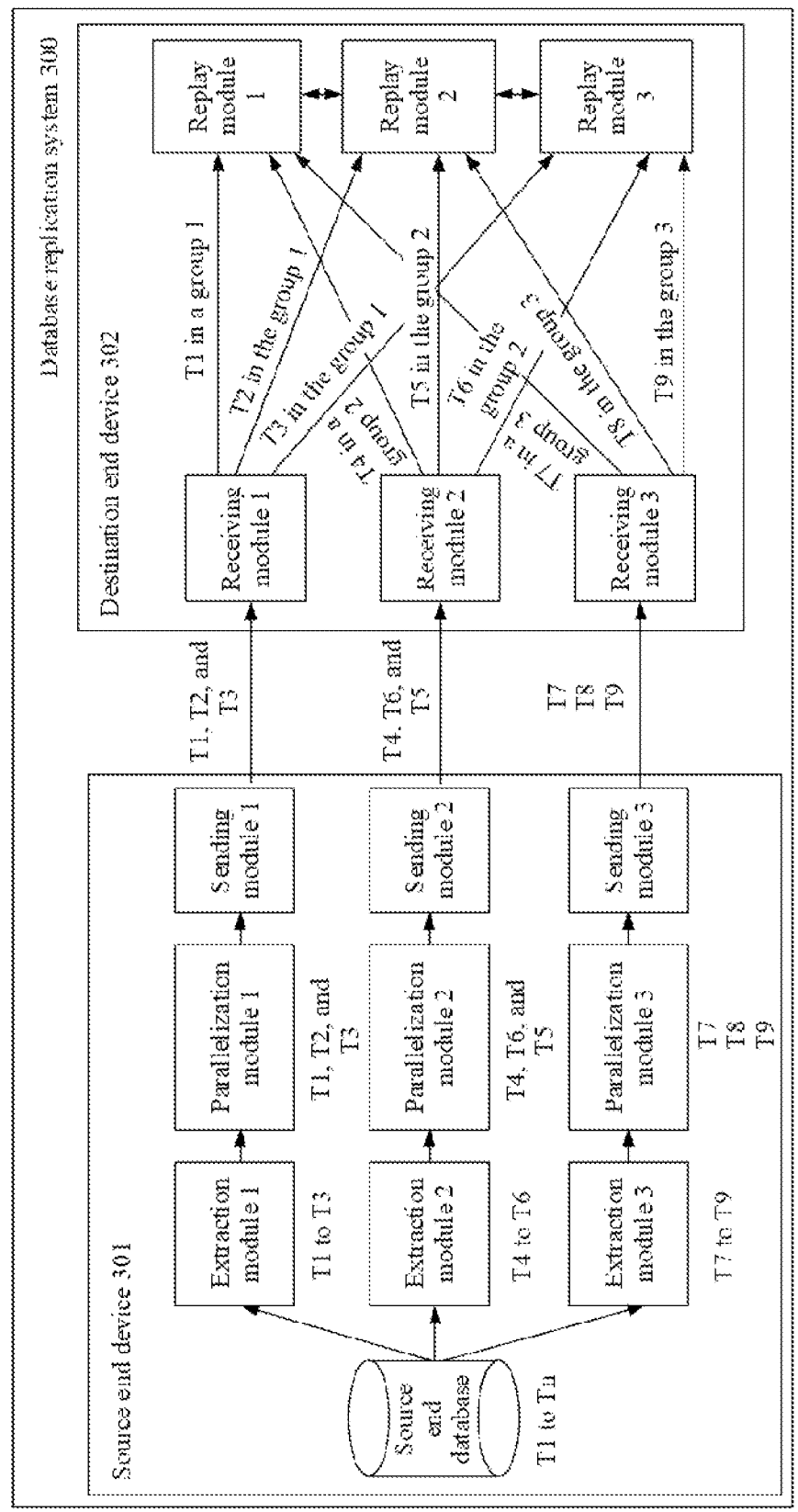
FIG. 8 is a schematic diagram of an example of performing data replication in the database replication system 300 shown in FIG. 7.

The following describes, by using a specific example, a processing procedure of performing data replication in the database replication system 300 shown in FIG. 7, to help understand a processing procedure of each module in this example more intuitively. FIG. 8 is a schematic diagram of an example of performing data replication in the database replication system 300 shown in FIG. 7.

As shown in FIG. 8, the source end database of the source end device 301 generates, within preset duration, a log file including n transaction logs, where the n transaction logs are respectively a transaction log 1 to a transaction log n, the source end device 301 includes three extraction modules: an extraction module 1 to an extraction module 3, three parallelization modules: a parallelization module 1 to a parallelization module 3, and three sending modules: a sending module 1 to a sending module 3, and the modules are one-to-one connected to each other. To be specific, the parallelization module 1 is connected to the extraction module 1 and the sending module 1, the parallelization module 2 is connected to the extraction module 2 and the sending module 2, and the parallelization module 3 is connected to the extraction module 3 and the sending module 3. Correspondingly, the destination end device 302 includes three receiving modules: a receiving module 1 to a receiving module 3, and three replay modules: a replay module 1 to a replay module 3, and the three receiving modules are one-to-one connected to the three replay modules. The sending modules in the source end device 301 are respectively connected to the three receiving modules in the destination end device 302.

Each extraction module first extracts a group of transaction logs from the log file of the source end database in parallel based on a respective number range. For example, transaction logs in a group 1 that are extracted by the extraction module 1 include a transaction log 1 to a transaction log 3, transaction logs in a group 2 that are extracted by the extraction module 2 include a transaction log 4 to a transaction log 6, and transaction logs in a group 3 that are extracted by the extraction module 3 include a transaction log 7 to a transaction log 9. Then, each extraction module sends the group of transaction logs that are extracted by the extraction module to a parallelization module connected to the extraction module. In FIG. 8, T1 to T9 are used as an example to mark the transaction log 1 to the transaction log 9.

After receiving the transaction logs in the group 1 that are sent by the extraction module 1, if the parallelization module 1 determines that the transaction log 2 depends on the transaction log 1, the parallelization module 1 adds a number 1 to a header of the transaction log 2, to indicate a dependency relationship between the transaction log 1 and the transaction log 2; and if the parallelization module 1 determines that the transaction log 3 and the transaction log 1 do not depend on another transaction log, the parallelization module 1 adds a number 0 to headers of the transaction log 1 and the transaction log 3. Then, the parallelization module 1 sends, to the sending module 1, the transaction log 1 to which the number is added to the transaction log 3 to which the number is added. After receiving the transaction logs in the group 2 that are sent by the extraction module 2, if the parallelization module 2 determines that the transaction log 6 depends on the transaction log 4, the parallelization module 2 adds a number 4 to a header of the transaction log 6; and if the parallelization module 2 determines that the transaction log 4 and the transaction log 5 do not depend on another transaction log, the parallelization module 2 adds a number 0 to headers of the transaction log 4 and the transaction log 5. Then, the parallelization module 2 sends, to the sending module 2, the transaction log 4 to which the number is added to the transaction log 6 to which the number is added. After receiving the transaction logs in the group 3 that are sent by the extraction module 3, if the parallelization module 3 determines that none of the transaction log 7 to the transaction log 9 depends on another transaction log, the parallelization module 3 adds a number 0 to headers of the transaction log 7 to the transaction log 9. Then, the parallelization module 3 sends, to the sending module 3, the transaction log 7 to which the number is added to the transaction log 9 to which the number is added.

After receiving a corresponding group of transaction logs, the sending module 1 to the sending module 3 each send a respective transaction log to a receiving module based on a number of the transaction log. For example, the sending module 1 performs hash calculation on the number 1, to learn that a calculation result is 1, so that the sending module 1 sends the transaction log 1 to which the number is added to the receiving module 1. In addition, the sending module 1 adds a number of a transaction log group to the transaction log 1, to indicate to the receiving module 1 that the transaction log group to which the transaction log 1 belongs is the group 1, and sends all transaction logs in the group 1 in a same manner. Details are not described herein. In FIG. 8, the sending module 1 respectively sends the transaction log 1 to the transaction log 3 to the receiving module 1 to the receiving module 3, the sending module 2 respectively sends the transaction log 4 to the transaction log 6 to the receiving module 1 to the receiving module 3, and the sending module 3 respectively sends the transaction log 7 to the transaction log 9 to the receiving module 1 to the receiving module 3, so that the receiving module 1 receives the transaction log 1 in the group 1, the transaction log 4 in the group 2, and the transaction log 7 in the group 3, the receiving module 2 receives the transaction log 2 in the group 1, the transaction log 5 in the group 2, and the transaction log 8 in the group 3, and the receiving module 3 receives the transaction log 3 in the group 1, the transaction log 6 in the group 2, and the transaction log 9 in the group 3. The receiving module sends the received transaction logs to a replay module connected to the receiving module.

After receiving the transaction logs, the replay module sequentially replays the transaction logs in the destination end database based on a dependency relationship between the transaction logs and a group in which the transaction logs are located. For example, the replay module 1 first executes a transaction log in the group 1, that is, the transaction log 1, and if the replay module 1 determines that the transaction log 1 does not depend on another transaction log, the replay module 1 directly performs replay in the destination end database based on the transaction log 1, and then sends a result that replay of the transaction log 1 is completed to the replay module 2 and the replay module 3. The replay module 2 first executes the transaction log 2 in the group 1. Because the transaction log 2 depends on the transaction log 1, the replay module 2 first waits for another replay module to send a result that replay of the transaction log 1 is completed. After receiving the result from the replay module 1, the replay module 2 performs replay in the destination end database based on the transaction log 2, and then sends a result that replay of the transaction log 2 is completed to the replay module 1 and the replay module 3. In addition, the replay module 3 first executes the transaction log 3 in the group 1. Because the transaction log 3 does not depend on another transaction log, the replay module 3 directly performs replay in the destination end database based on the transaction log 3, and then sends a result that replay of the transaction log 3 is completed to the replay module 1 and the replay module 2.

Then, the replay module 1 may determine whether replay of all transaction logs in the group 1 are completed, and after replay of all the transaction logs in the group 1 are completed, the replay module 1 performs replay based on the transaction log in the group 2. For example, all the transaction logs in the group 1 are cached in a $1^{st}$ replay queue. If replay of all transaction logs in the $1^{st}$ replay queue are completed, the replay module 1 may determine that replay of all the transaction logs in the group 1 are completed, and performs replay based on a transaction log in a $2^{nd}$ replay queue. A process of replaying the transaction log in the group 2 is similar to a process of replaying the transaction log in the group 1. Details are not described herein again. When each replay module replays all transaction logs received by the replay module, the same data as that in the source end database is obtained in the destination end database, so that the data in the source end database is replicated to the destination end database.

Example 4

Different from the database replication system 300 in Example 2, in the database replication system 300 in this example, a function of the parallelization module disposed in the source end device 301 may be migrated to the destination end device 302. To be specific, the source end device 301 does not need to provide a dependency relationship between a plurality of transaction logs included in each group of transaction logs, but the destination end device 302 determines the dependency relationship between the plurality of transaction logs included in each group of transaction logs.

Specifically, for the first group of transaction logs, the destination end device 302 records a number of a first transaction log in a second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number that is of the first transaction log and that is carried in the second transaction log is used to indicate a dependency relationship between the first transaction log and the second transaction log, that is, the second transaction log depends on the first transaction log.

For the second group of transaction logs, the destination end device 302 records a number of a third transaction log in a fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number that is of the third transaction log and that is carried in the fourth transaction log is used to indicate a dependency relationship between the third transaction log and the fourth transaction log, that is, the fourth transaction log depends on the third transaction log.

A manner in which the destination end device 302 determines the dependency relationship between the plurality of transaction logs included in each group of transaction logs is similar to that of the source end device 301 in Example 2. Details are not described herein again.

Figure 9:
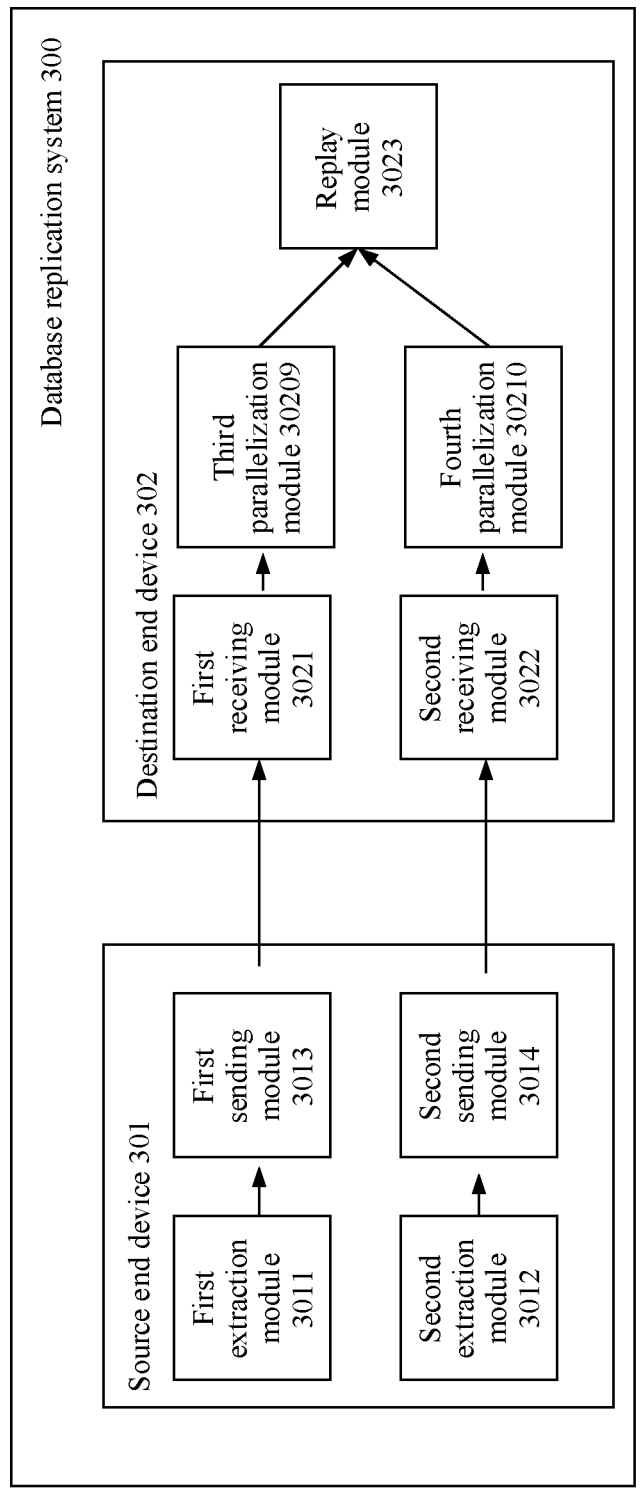
FIG. 9 is a structural block diagram of another example of the database replication system 300.

In this case, FIG. 9 is a structural block diagram of another example of the database replication system 300.

Different from the structure shown in FIG. 6, in this structure, locations at which two parallelization modules are disposed are changed, and the two parallelization modules are changed from being disposed in the source end device 301 in FIG. 6 to being disposed in the destination end device 302. FIG. 9 includes a third parallelization module 30209 and a fourth parallelization module 30210. Each parallelization module is connected to one receiving module, and is configured to receive a group of transaction logs from one receiving module, and each parallelization module is connected to a replay module, that is, each parallelization module may send a transaction log to the replay module.

The third parallelization module 30209 is similar to the first parallelization module 3015 shown in FIG. 6, the fourth parallelization module 30210 is similar to the second parallelization module 3016 shown in FIG. 6, and other modules are respectively similar to corresponding modules shown in FIG. 6. Details are not described herein again.

Figure 10:
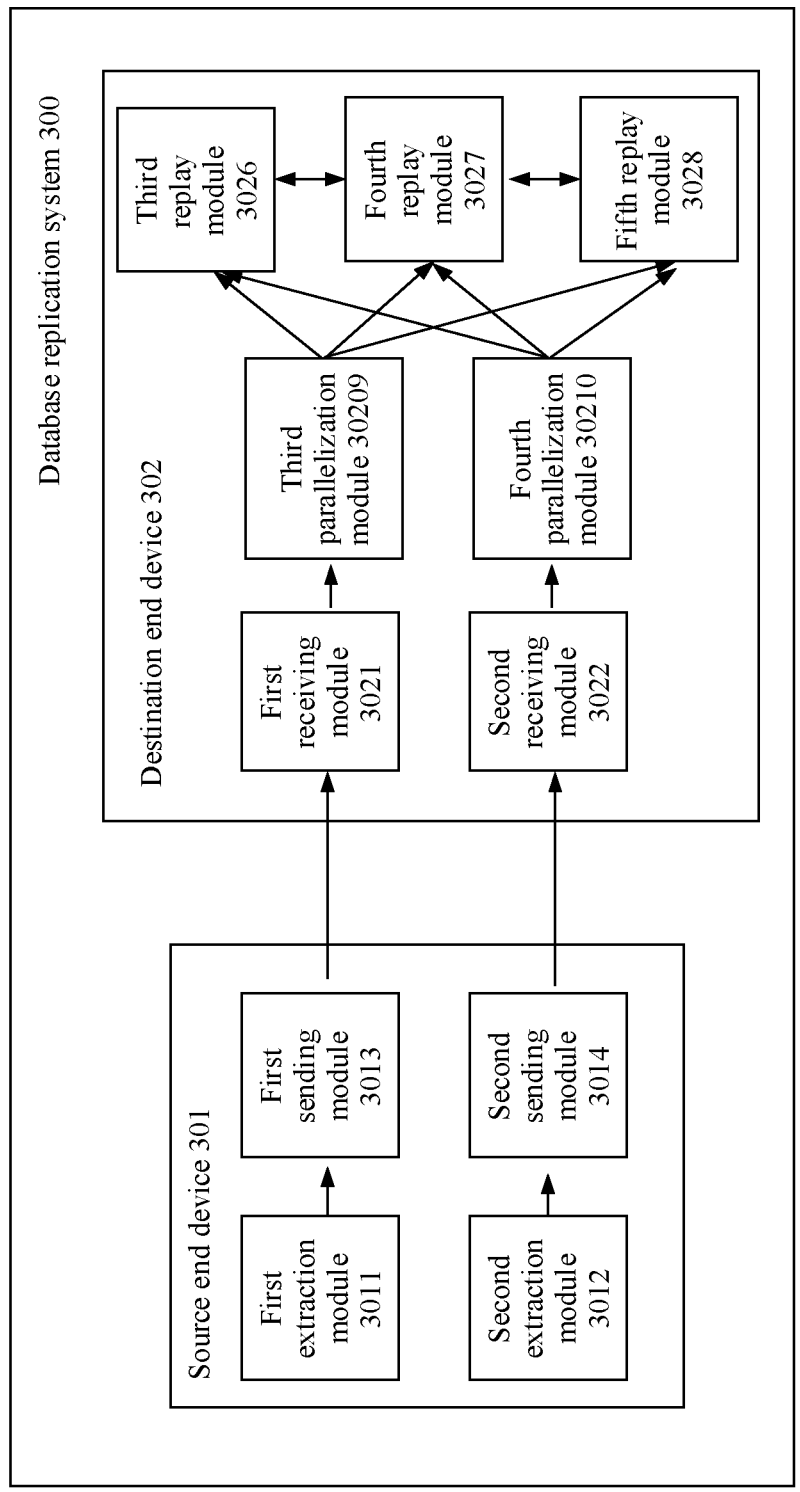
FIG. 10 is a structural block diagram of another example of the database replication system 300.

In FIG. 9, there is one replay module. Certainly, there may alternatively be a plurality of replay modules. As shown in FIG. 10, three replay modules are included: a third replay module 3026, a fourth replay module 3027, and a fifth replay module 3028. Therefore, each parallelization module is connected to all replay modules, and is configured to send a transaction log to any replay module. In this case, each parallelization module is further configured to perform a process of sending each transaction log in a received group of transaction logs to a plurality of replay modules. For example, each parallelization module may randomly distribute each transaction log in the received group of transaction logs to any replay module, or may distribute each transaction log in the received group of transaction logs to the replay module in a preset sequence, or may number each replay module. According to a load balancing principle, each parallelization module performs hash calculation based on a number of each transaction log, to learn that a hash calculation result is a number of a replay module to which each transaction log needs to be distributed, so that each parallelization module distributes the transaction log to the corresponding replay module. For a specific process, refer to the first example to the third example in which the receiving module distributes the transaction log in the example shown in FIG. 7. Details are not described herein again.

Example 5

Figure 11:
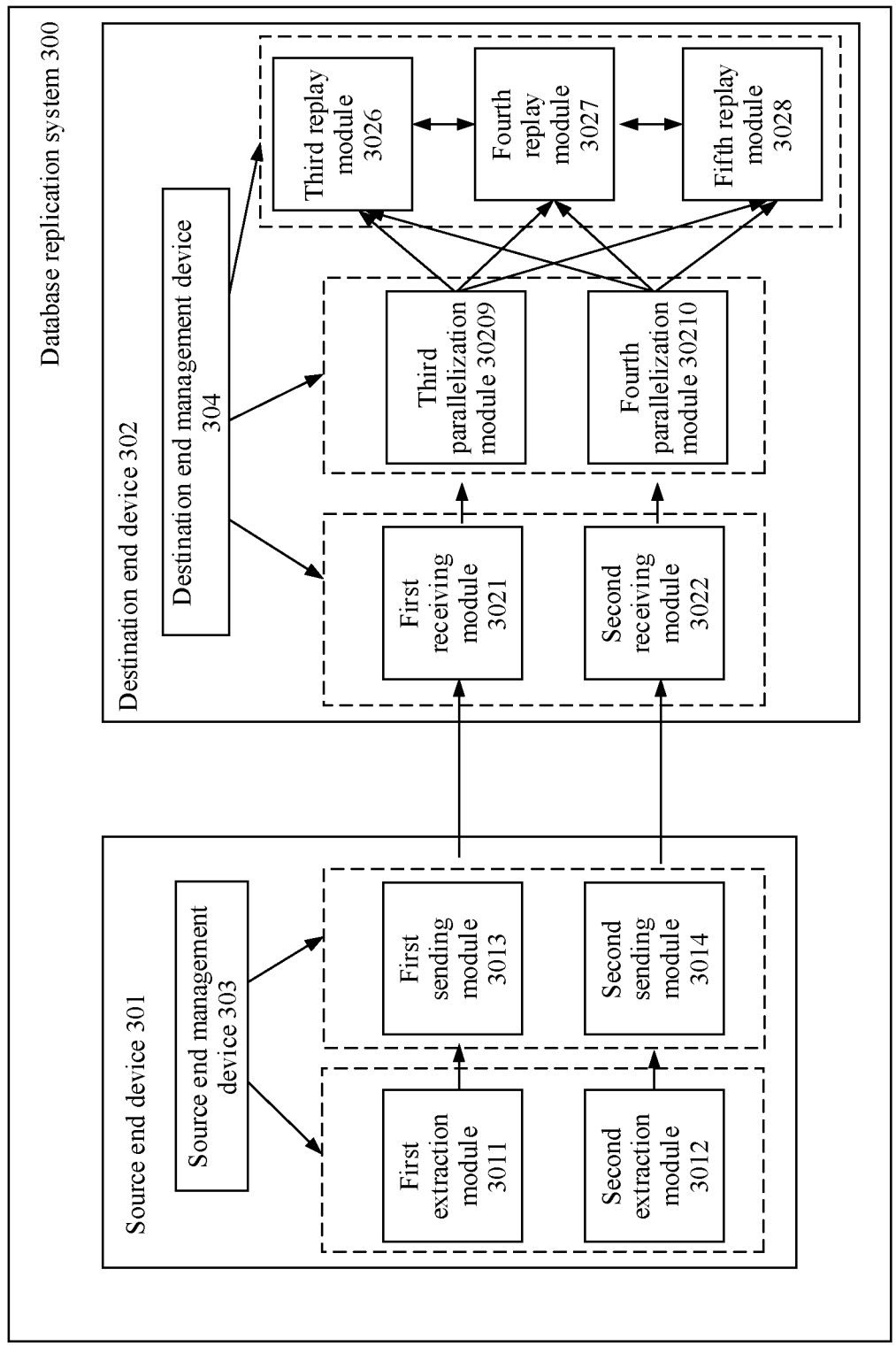
FIG. 11 is a structural block diagram of another example of the database replication system 300.

FIG. 11 is a structural block diagram of another example of the database replication system 300.

Different from the structure shown in FIG. 10, in this structure, FIG. 11 further includes management devices: a source end management device 303 and a destination end management device 304. Other modules are similar to those in FIG. 10. Details are not described herein again.

The source end management device 303 may allocate, to each extraction module, a number range used to obtain a group of transaction logs, and each extraction module extracts a corresponding transaction log based on the number range allocated by the source end management device 303; and/or the source end management device 303 may be further configured to: monitor a running status of each module in the source end device 301, and dynamically adjust a quantity and a range of transaction logs extracted by each extraction module. For example, if the source end management device 303 monitors that an extraction module is faulty, the source end management device 303 may allocate a transaction log that needs to be obtained by the extraction module to another extraction module.

The destination end management device 304 is configured to: monitor a running status of each module in the destination end device 302, and dynamically adjust a quantity of transaction logs to be processed by each receiving module and each replay module. For example, when the destination end management device 304 monitors that a replay module is faulty, the destination end management device 304 may indicate each receiving module not to send a transaction log to the faulty replay module, and distribute a transaction log that needs to be replayed by the faulty replay module to another replay module.

In an example, when monitoring that a replay module is faulty, the destination end management device 304 collects related information, for example, a number of a current transaction log processed by the faulty replay module and a number of the faulty replay module, and then sends the collected related information to another replay module. Then, each replay module redistributes, to another non-faulty replay module, a transaction log whose generation time point of the transaction log is later than a generation time point of the current transaction log processed by the faulty replay module, so that the another non-faulty replay module replays the transaction log in the destination end database.

If the transaction log received by each replay module is distributed by the sending module in the source end device 301, the destination end management device 304 needs to send the collected related information to the source end management devices 303, and the source end management device 303 forwards the related information to each sending module, to redistribute, to another non-faulty replay module, a transaction log whose generation time point of the transaction log is later than a generation time point of the current transaction log processed by the faulty replay module.

When the receiving module in the destination end device 302 or the sending module in the source end device 301 redistributes the transaction log, a redistribution flag may be added to the redistributed transaction log, for example, a "secondary hash redistribution" flag may be added. In this case, a replay module that receives a $1^{st}$ transaction log carrying the "secondary hash redistribution" flag may immediately perform transaction replay to complete recovery. For example, if a number of a transaction log that is being processed by a faulty replay module is 3, the $1^{st}$ transaction log carrying the "secondary hash redistribution" flag is a transaction log 4. In this case, after receiving the transaction log that is numbered 4 and that carries the "secondary hash redistribution" flag, a replay module directly performs replay in the destination end database based on the transaction log, and then sends a replay result to another replay module. Other transaction logs are replayed in the destination end database in the foregoing manner based on a transaction log group to which each transaction log belongs and a dependency relationship. Therefore, an entire replay process is recovered.

Certainly, if another module is faulty, the source end management device 303 and the destination end management device 304 may alternatively reallocate a task of a non-faulty module in a similar manner, to ensure system stability.

In addition, the modules in the foregoing examples may also be freely combined. This is not limited to the combination manners in the foregoing examples.

In the foregoing technical solution, the dependency relationship between the transaction logs is considered only when the transaction logs are replayed. In this way, before the transaction logs are replayed, the transaction logs may be grouped into a plurality of groups, and extracted and sent in parallel without considering the dependency relationship between the transaction logs, so that processing efficiency of the database replication system can be improved. In addition, because the transaction logs are replayed in the destination end database based on the dependency relationship between the transaction logs, it can be ensured that the same data as that in the source end database can be obtained in the destination end database, to ensure data consistency.

Figure 12:
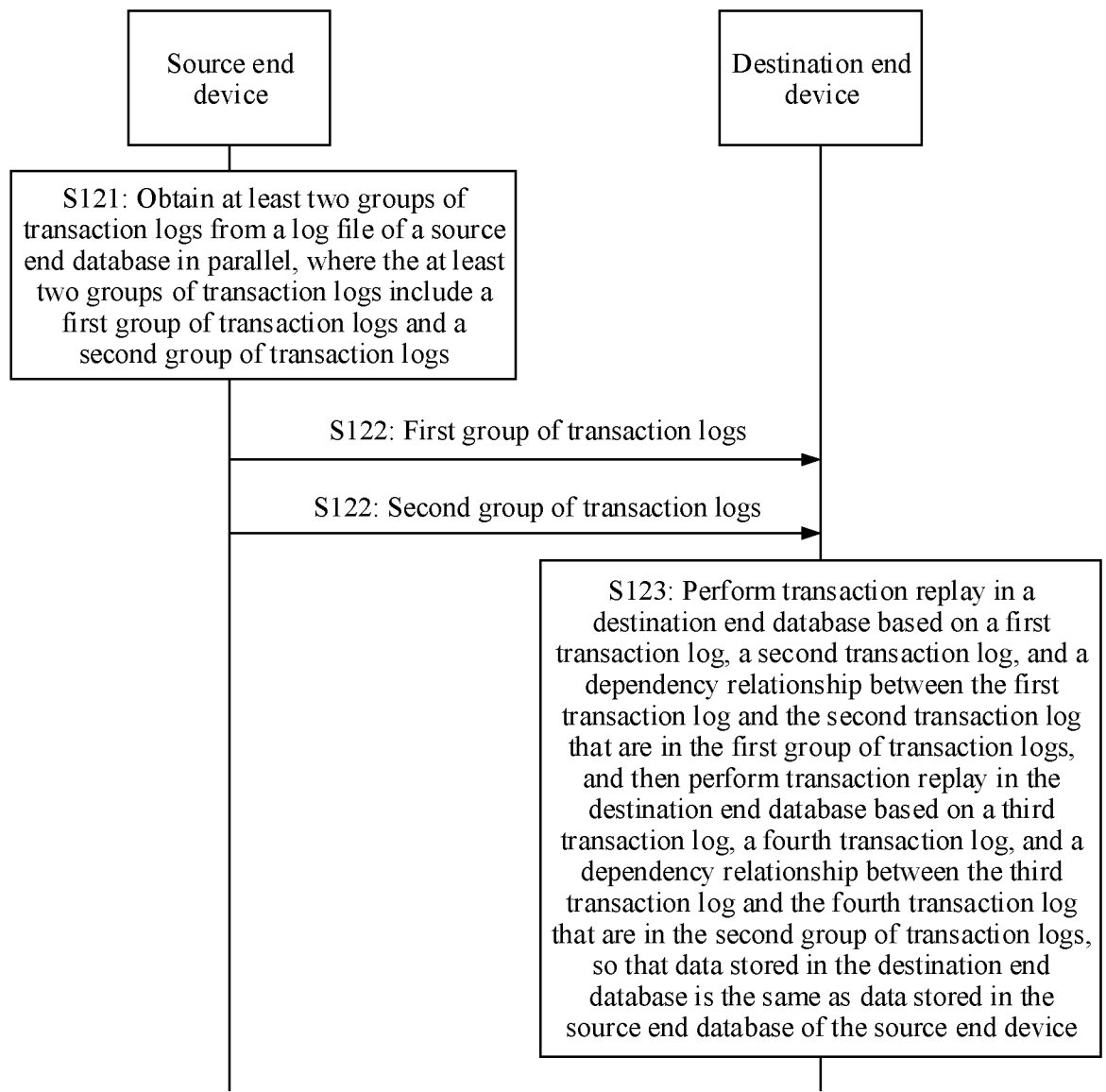
FIG. 12 is a flowchart of an example of a database replication method according to an embodiment of this application.

Based on a same inventive concept, an embodiment of this application provides a database replication method. The method may be applied to the database replication system shown in FIG. 3 to FIG. 11. FIG. 12 is a flowchart of an example of the method. The flowchart is described as follows:

S121: A source end device obtains at least two groups of transaction logs from a log file of a source end database in parallel, where the at least two groups of transaction logs include a first group of transaction logs and a second group of transaction logs.

In this embodiment of this application, a quantity of groups of transaction logs is not limited. For ease of description, an example in which the at least two groups of transaction logs include the first group of transaction logs and the second group of transaction logs is used below. The first group of transaction logs includes at least a first transaction log and a second transaction log that are adjacent to each other, the second group of transaction logs includes at least a third transaction log and a fourth transaction log that are adjacent to each other, and a generation time point of the second transaction log is earlier than a generation time point of the third transaction log. For descriptions of the first group of transaction logs and the second group of transaction logs, refer to corresponding content in Example 1. Details are not described herein again.

In this embodiment of this application, a manner in which the source end device obtains the first group of transaction logs and the second group of transaction logs from the source end database in parallel may include but is not limited to the following three manners:

Obtaining Manner 1:

The source end device first needs to determine an extraction range of a group of transaction logs that need to be extracted by the source end device, and then obtain the first group of transaction logs and the second group of transaction logs based on respective extraction ranges.

Obtaining Manner 2:

The source end device obtains the first group of transaction logs and the second group of transaction logs from the source end database in parallel based on a number range of transaction logs.

Obtaining Manner 3:

When storing the transaction log, the source end device may generate log summary record information corresponding to each transaction log, where the log summary record information records a number of a transaction log generated by the source end database, a recording location and a length that are of the transaction log in the log file, and a quantity of transaction logs in the log file. Then, when the source end device needs to obtain the transaction log, the source end device first reads the log summary record information, and obtains the first group of transaction logs and the second group of transaction logs from the log file in parallel based on the log summary record information.

For descriptions of the foregoing three obtaining manners, refer to descriptions of the extraction module in any one of the foregoing examples. Details are not described herein again.

It should be noted that, in this embodiment of this application, an example in which the source end device obtains two groups of transaction logs is used for description. In an actual use process, a quantity of groups of transaction logs obtained by the source end device in parallel is not limited. For example, three groups of transaction logs, four groups of transaction logs, or even more groups of transaction logs may be obtained in parallel. This is not limited herein.

S122: The source end device sends the first group of transaction logs and the second group of transaction logs in parallel, and a destination end device receives the first group of transaction logs and the second group of transaction logs.

If the source end device and the destination end device are disposed in different areas or different data centers, the source end device may send the first group of transaction logs and the second group of transaction logs to the destination end device through a remote connection between the source end device and the destination end device.

For a specific implementation, refer to descriptions of the sending module in any one of the foregoing examples. Details are not described herein again.

S123: The destination end device performs transaction replay in a destination end database based on the first transaction log, the second transaction log, and a dependency relationship between the first transaction log and the second transaction log that are in the first group of transaction logs, and then performs transaction replay in the destination end database based on the third transaction log, the fourth transaction log, and a dependency relationship between the third transaction log and the fourth transaction log that are in the second group of transaction logs, so that data stored in the destination end database is the same as data stored in the source end database of the source end device.

Specifically, the destination end device first needs to determine a dependency relationship between a plurality of transaction logs included in each group of transaction logs, for example, determine the dependency relationship between the first transaction log and the second transaction log included in the first group of transaction logs, and determine the dependency relationship between the third transaction log and the fourth transaction log included in the second group of transaction logs. Then, the destination end device performs replay in the destination end database based on the dependency relationship between the transaction logs in each group of transaction logs and the group of transaction logs.

In this embodiment of this application, that the dependency relationship between the first transaction log and the second transaction log included in the first group of transaction logs is determined includes:

recording a number of the first transaction log in the second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate the dependency relationship between the first transaction log and the second transaction log.

That the dependency relationship between the third transaction log and the fourth transaction log included in the second group of transaction logs is determined includes:

recording a number of the third transaction log in the fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate the dependency relationship between the third transaction log and the fourth transaction log.

For a specific implementation, refer to descriptions of the parallelization processing module in the destination end device 302 in Example 4. Details are not described herein again.

After determining the dependency relationship between the transaction logs in each group of transaction logs, the destination end device replays the transaction logs in the destination end database based on the dependency relationship between the transaction logs.

In an example, when obtaining the first transaction log, the destination end device determines that the first transaction log does not record a number that is of a transaction log and that is used to indicate that there is a dependency relationship with the first transaction log, and performs transaction replay in the destination end database based on the first transaction log. Then, when obtaining the second transaction log, the destination end device determines that the second transaction log records the number that is of the first transaction log and that is used to indicate the dependency relationship between the first transaction log and the second transaction log, and after determining that transaction replay performed based on the first transaction log is completed, performs transaction replay in the destination end database based on the second transaction log.

When obtaining the third transaction log, the destination end device determines that the third transaction log does not record a number that is of a transaction log and that is used to indicate that there is a dependency relationship with the third transaction log, and performs transaction replay in the destination end database based on the third transaction log. Then, when obtaining the fourth transaction log, the destination end device determines that the fourth transaction log records the number that is of the third transaction log and that is used to indicate the dependency relationship between the fourth transaction log and the third transaction log, and after determining that transaction replay performed based on the third transaction log is completed, performs transaction replay in the destination end database based on the fourth transaction log.

For a specific implementation, refer to descriptions of the replay module in any one of the foregoing examples. Details are not described herein again.

When replaying all transaction logs in the destination end database in the foregoing manner, the destination end device may obtain the data in the source end database, to be consistent with the source end database.

In the foregoing technical solution, before performing transaction replay, the destination end device needs to first determine the dependency relationship between the transaction logs in each group of transaction logs. In some other embodiments, the source end device may also determine the dependency relationship between the transaction logs in each group of transaction logs, so that an operation amount of the destination end device can be reduced.

Figure 13:
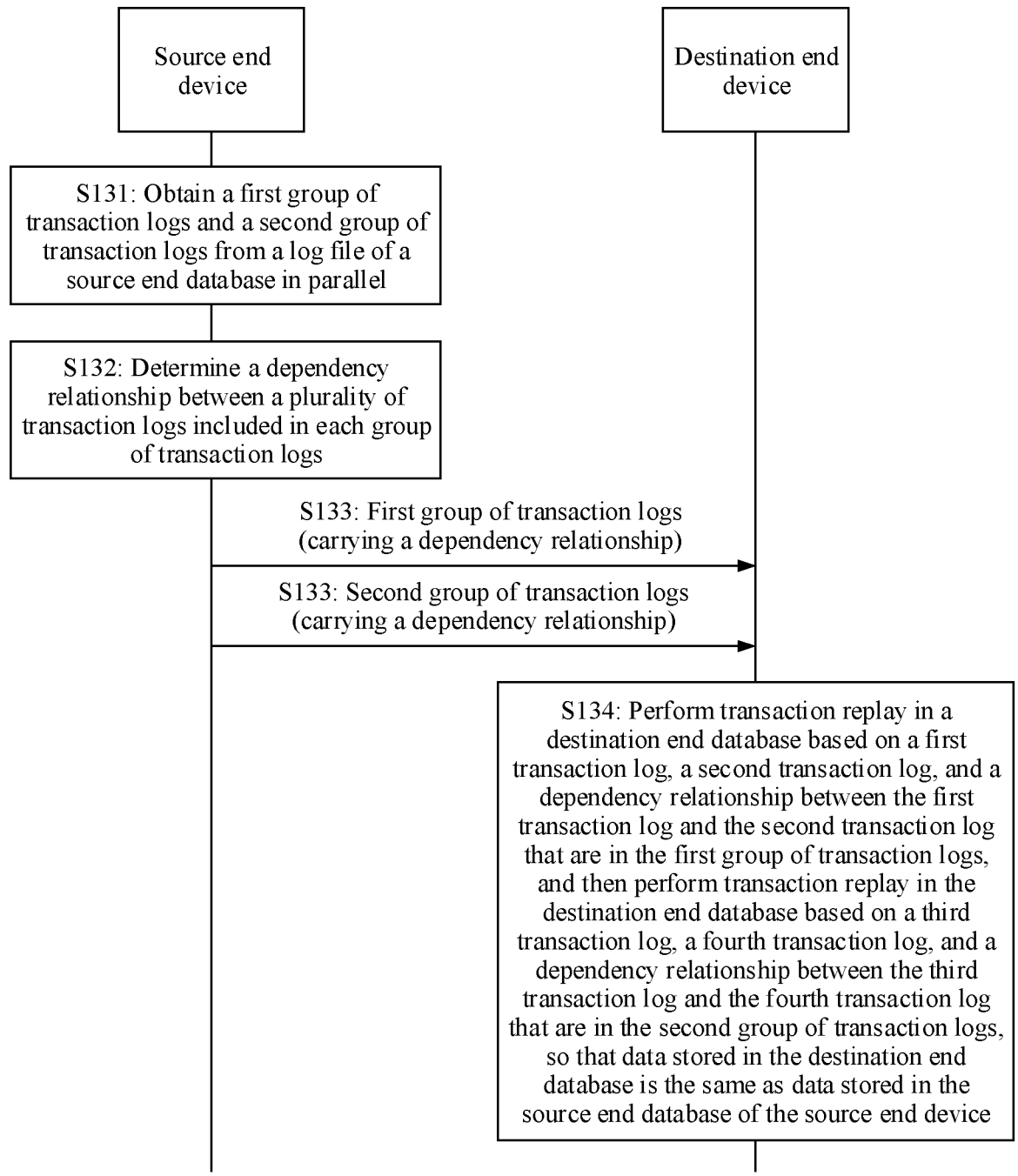
FIG. 13 is a flowchart of another example of a database replication method according to an embodiment of this application.

FIG. 13 is a flowchart of another example of the method. The flowchart is described as follows:

S131: A source end device obtains a first group of transaction logs and a second group of transaction logs from a log file of a source end database in parallel.

S132: The source end device determines a dependency relationship between a plurality of transaction logs included in each group of transaction logs.

In an example, for the first group of transaction logs, the source end device records a number of a first transaction log in a second transaction log when determining that an operation object of a first transaction operation recorded in the first transaction log in the source end database is the same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, where the number of the first transaction log is used to indicate a dependency relationship between the first transaction log and the second transaction log.

For the second group of transaction logs, the source end device records a number of a third transaction log in a fourth transaction log when determining that an operation object of a third transaction operation recorded in the third transaction log in the source end database is the same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, where the number of the third transaction log is used to indicate a dependency relationship between the third transaction log and the fourth transaction log.

For a manner in which the source end device determines the dependency relationship between the transaction logs, refer to the descriptions of the parallelization module in Example 2. Details are not described herein again.

S133: The source end device sends the first group of transaction logs and the second group of transaction logs in parallel, and a destination end device receives the first group of transaction logs and the second group of transaction logs.

It should be noted that in this case, the transaction log sent by the source end device carries a number of a transaction log on which the transaction log depends. If a transaction log does not depend on a transaction log, the transaction log may not carry a number of another transaction log, or a carried number of a transaction log is 0.

S134: The destination end device performs transaction replay in a destination end database based on the first transaction log, the second transaction log, and the dependency relationship between the first transaction log and the second transaction log that are in the first group of transaction logs, and then performs transaction replay in the destination end database based on the third transaction log, the fourth transaction log, and the dependency relationship between the third transaction log and the fourth transaction log that are in the second group of transaction logs, so that data stored in the destination end database is the same as data stored in the source end database of the source end device.

Step S133 and step S134 are respectively similar to step S122 and step S123. Details are not described herein again.

In the foregoing technical solution, the source end device obtains and sends a plurality of groups of transaction logs in parallel, so that data replication efficiency can be improved. In addition, the destination end device performs, based on the dependency relationship between the transaction logs, transaction log replay on the plurality of groups of transaction logs sent in parallel, so that accuracy of the obtained data can be ensured, to ensure consistency between the data in the destination end database and the data in the source end database.

Functions of the source end device and the destination end device described in the foregoing embodiment may be implemented by the functional module, the application program, or the thread implemented by the program code, the virtualization function instance, or the container. For example, a source end management module, a plurality of extraction modules, a plurality of parallelization modules, and a plurality of sending modules may be disposed in the source end device. The source end management module is configured to monitor a running status of another module in the source end device. Each extraction module is configured to obtain a group of transaction logs from the log file of the source end database, and the plurality of extraction modules obtain a plurality of groups of transaction logs in parallel. Each parallelization module is configured to obtain a group of transaction logs from one extraction module, determine a dependency relationship between a plurality of transaction logs in the group of transaction logs, and then send the group of transaction logs including the dependency relationship to a sending module. The sending module sends the group of transaction logs including the dependency relationship to the destination end device. A destination end management module and a plurality of replay modules may be disposed in the destination end device. The destination end management module is configured to monitor a running status of another module in the destination end device. Each replay module is configured to receive a transaction log from the source end device, and the plurality of replay modules cooperate to complete replay of all transaction logs.

The following describes, by using the plurality of modules as an example, the database replication method provided in the embodiments of this application.

Figure 14B:
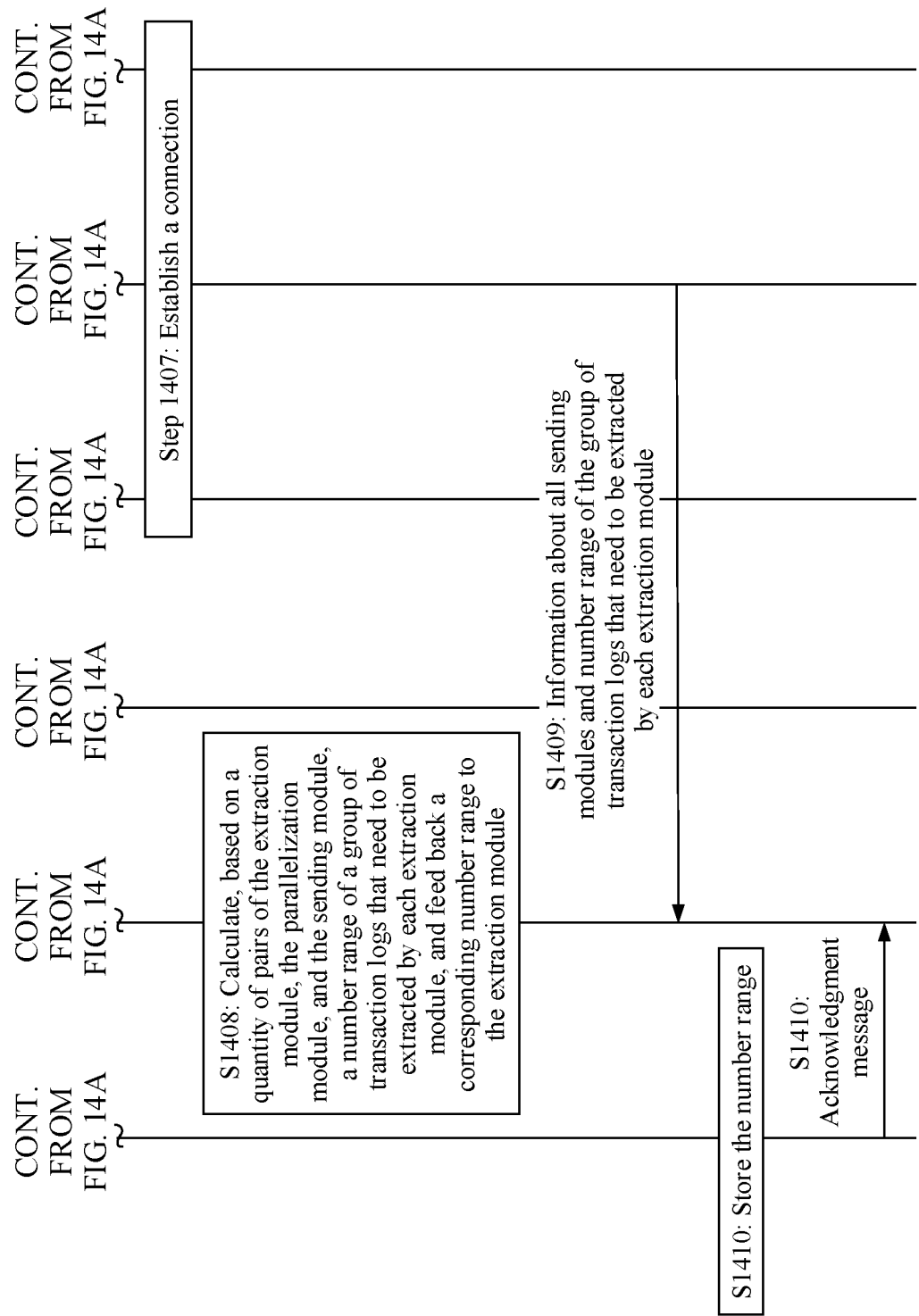

Before the database replication method in this embodiment of this application is implemented by using the foregoing modules, initialization setting needs to be performed on the modules. FIG. 14A and FIG. 14B are a flowchart of performing initialization setting on modules. The flowchart is described as follows:

S1401: A source end management module reads local end configuration data.

The configuration data may be preset by a person skilled in the art. For example, the configuration data may include a topology relationship and information about a network connection between an extraction module, a parallelization module, and a sending module. In addition, the source end management module listens to a connection establishment request sent by each of the extraction module, the parallelization module, the sending module, and a destination end management module.

For ease of description, one extraction module, one parallelization module, and one sending module are used as examples for schematic description in FIG. 14A and FIG. 14B. When there are a plurality of extraction modules, a plurality of parallelization modules, and a plurality of sending modules, a processing process of each module is the same as a processing process of the module corresponding to FIG. 14A and FIG. 14B.

S1402: The destination end management module reads local end configuration data.

The configuration data may be preset by a person skilled in the art. For example, the configuration data may include information about a network connection between replay modules, and is used to listen to a connection establishment request sent by the replay module to the destination end management module.

For ease of description, one replay module is used as an example for schematic description in FIG. 14A and FIG. 14B. When there are a plurality of replay modules, a processing process of each replay module is the same as a processing process of the replay module shown in FIG. 14A and FIG. 14B.

S1403: The extraction module, the parallelization module, and the sending module each send the connection establishment request to the source end management module, and establish a connection to the source end management module.

S1404: The replay module sends the connection establishment request to the destination end management module, and establishes a connection to the destination end management module.

S1405: The destination end management module sends the connection establishment request to the source end management module, and establishes a connection to the source end management module.

The destination end management module may further send, to the source end management module, a number of a last replayed transaction log in a destination end device, information about the replay module connected to the destination end management module, and/or the like. When there are the plurality of replay modules, information about all the replay modules is sent.

S1406: The source end management module separately sends a connection acknowledgment message and connection information corresponding to each module to the parallelization module and the sending module.

For example, the source end management module feeds back, to each parallelization module, information about the extraction module and the sending module that are connected to the source end management module, and sends, to each sending module, information about the parallelization module connected to the source end management module and the replay module.

S1407: The extraction module, the parallelization module, the sending module, and the replay module establish a connection.

S1408: The source end management module calculates, based on a quantity of pairs of the extraction module, the parallelization module, and the sending module, a number range of a group of transaction logs that need to be extracted by each extraction module, and feeds back a number range corresponding to the extraction module to the extraction module.

For example, there are four extraction modules. Each extraction module is configured to extract 2500 transaction logs. To be specific, a number range of a group of transaction logs obtained by a $1^{st}$ extraction module is 1 to 2500, a number range of a group of transaction logs obtained by a $2^{nd}$ extraction module is 2501 to 5000, and so on.

S1409: The source end management module feeds back, to the destination end management module, information about all sending modules and the number range of the group of transaction logs that need to be extracted by each extraction module.

S1410: Each extraction module stores a number range corresponding to the extraction module, and returns an acknowledgment message to the source end management module.

Initiation configuration on a database replication system is completed by using the foregoing steps. After the initial configuration on the database replication system is completed, the database replication system may perform database replication.

Figure 15A:
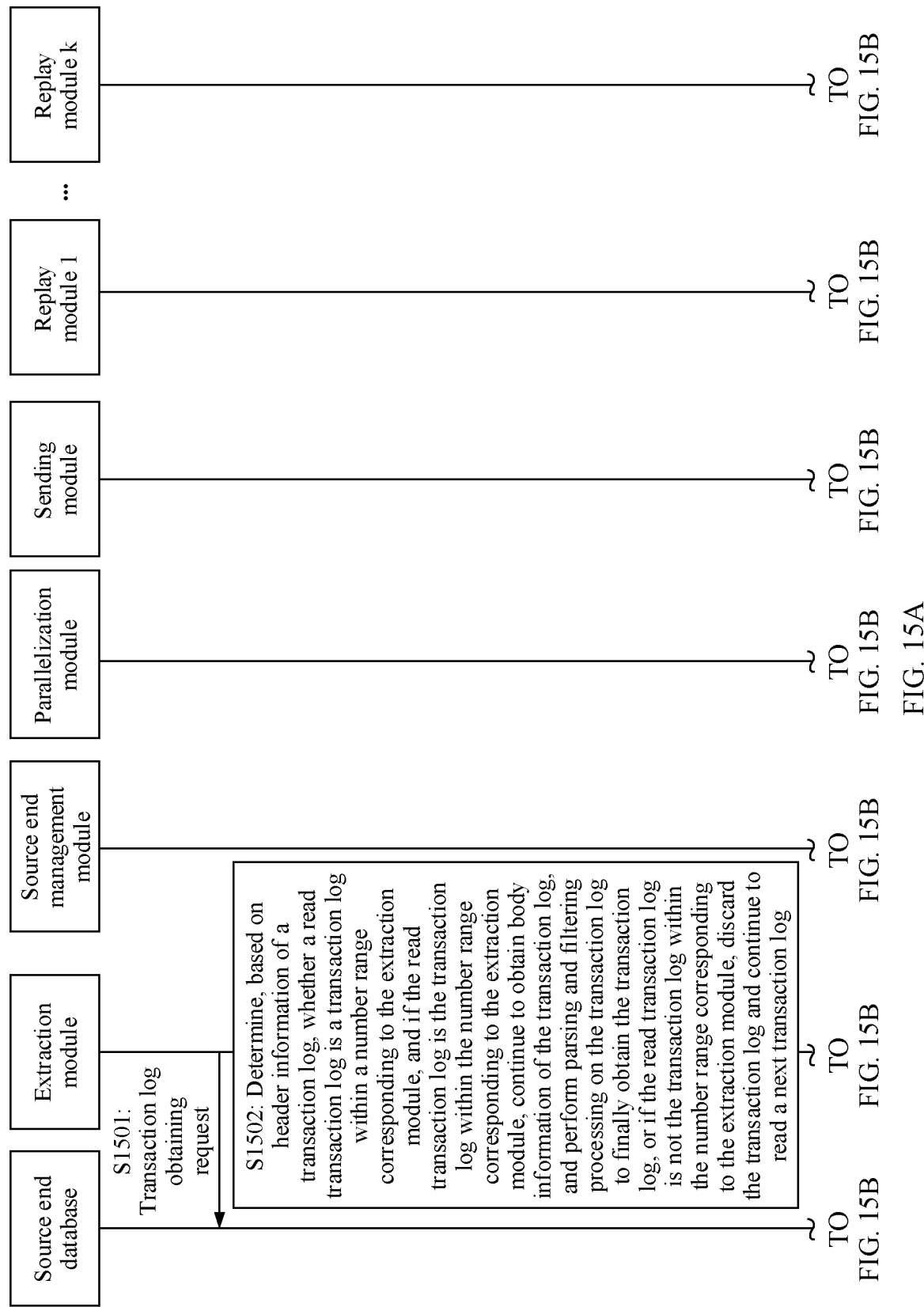
FIG. 15A, FIG. 15B, and FIG. 15C are a flowchart of performing database replication by modules according to an embodiment of this application.
Figure 15B:
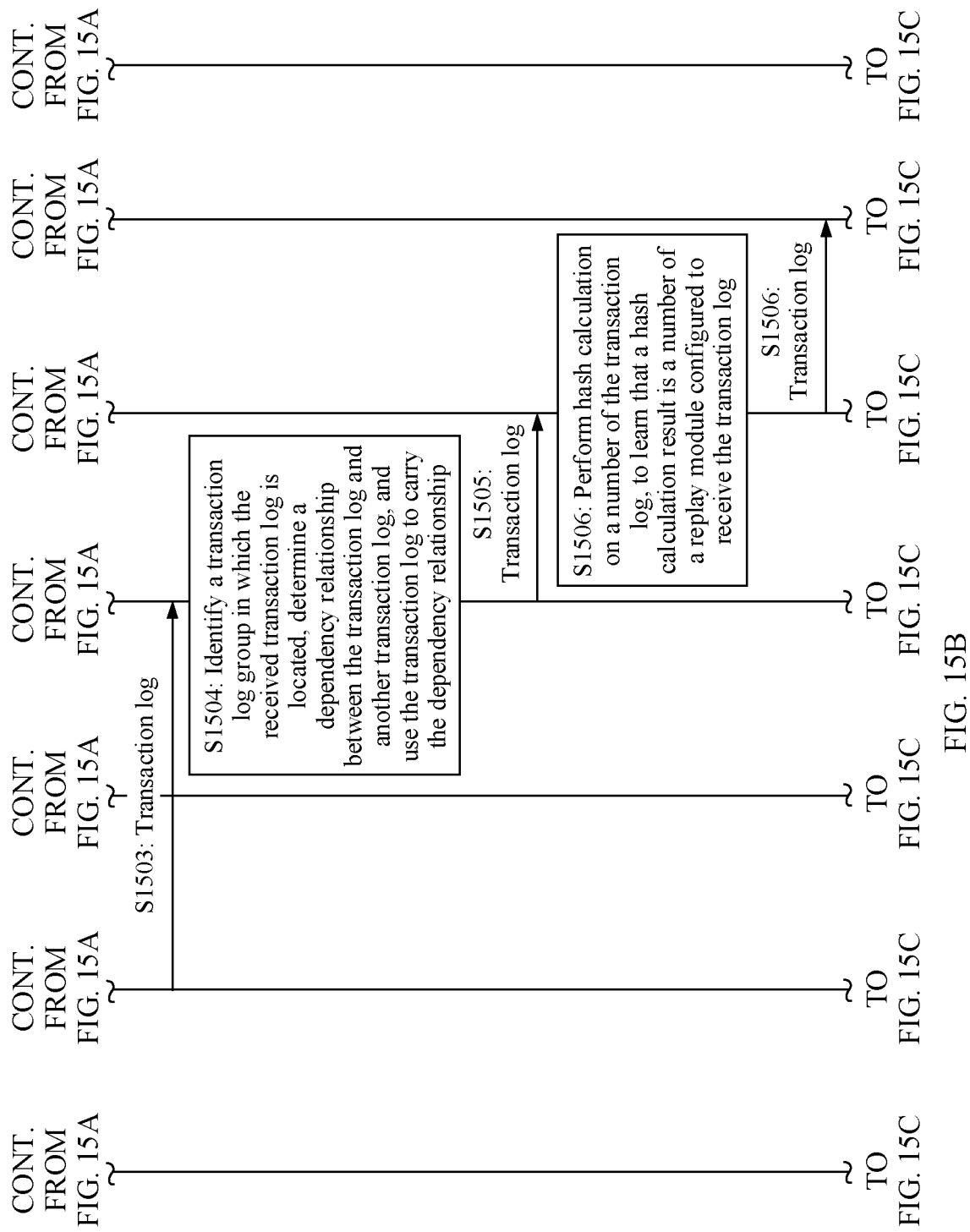
Figure 15C:
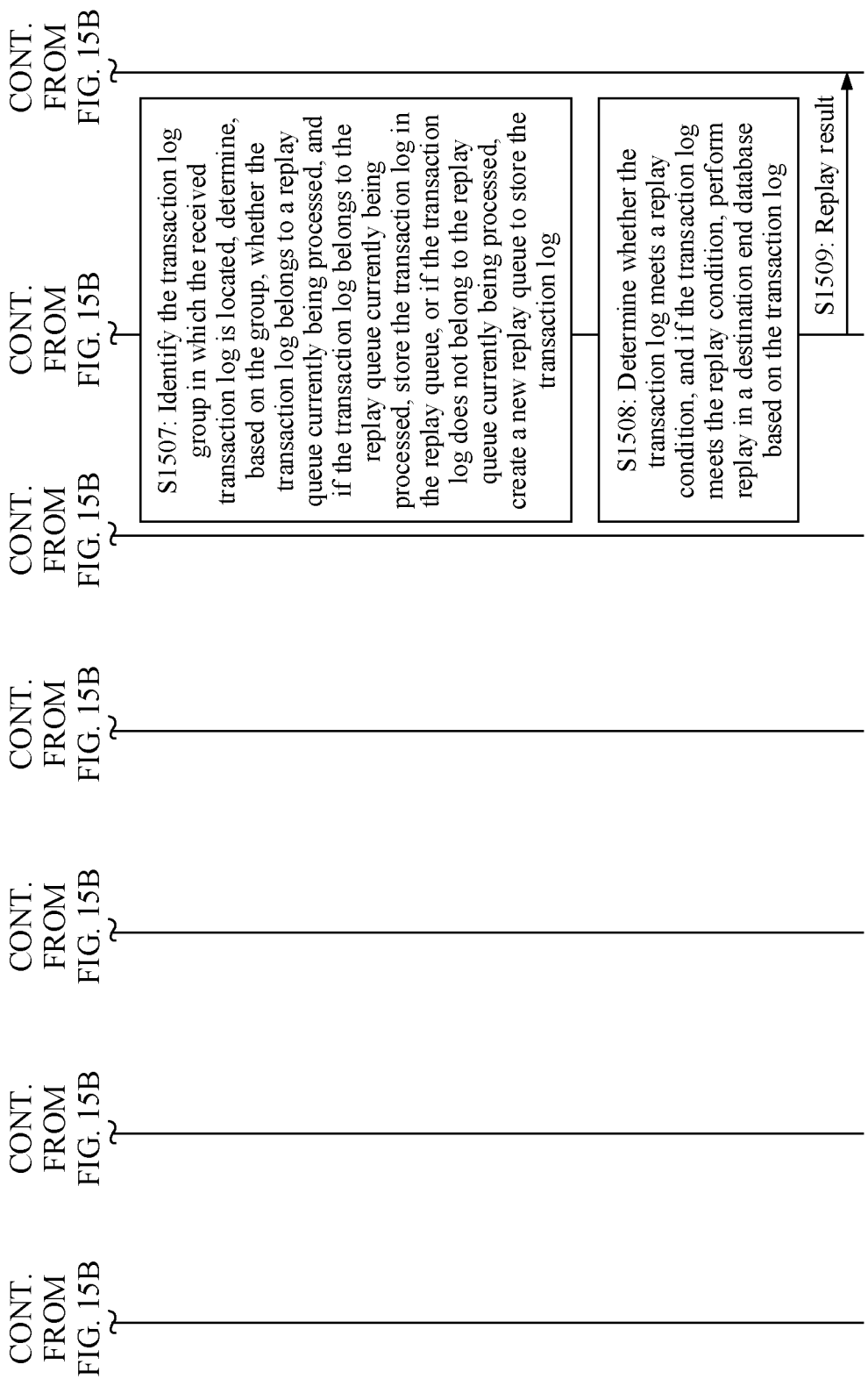

FIG. 15A, FIG. 15B, and FIG. 15C are a flowchart of performing database replication by modules. The flowchart is described as follows:

S1501: Each extraction module initiates a transaction log obtaining request to a source end database.

The transaction log obtaining request is used to obtain a transaction log. Because processing procedures of all extraction modules are the same, only one extraction module is used as an example for description in the example shown in FIG. 15A, FIG. 15B, and FIG. 15C.

S1502: The extraction module determines, based on header information of the transaction log, whether a read transaction log is a transaction log within a number range corresponding to the extraction module, and if the read transaction log is the transaction log within the number range corresponding to the extraction module, continues to obtain body information of the transaction log, and performs parsing and filtering processing on the transaction log to finally obtain the transaction log, or if the read transaction log is not the transaction log within the number range corresponding to the extraction module, discards the transaction log and continues to read a next transaction log.

S1503: The extraction module sends the obtained transaction log to a parallelization module connected to the extraction module.

S1504: The parallelization module identifies a transaction log group in which the received transaction log is located, determines a dependency relationship between the transaction log and another transaction log, and uses the transaction log to carry the dependency relationship.

S1505: The parallelization module sends the transaction log that carries the dependency relationship to a sending module connected to the parallelization module.

S1506: The sending module performs hash calculation on a number of the transaction log, to learn that a hash calculation result is a number of a replay module configured to receive the transaction log, and sends the transaction log to a corresponding replay module.

In this example, an example in which there are K replay modules is used. The sending module determines to send the transaction log to a replay module 1.

S1507: The replay module 1 identifies the transaction log group in which the received transaction log is located, determines, based on the group, whether the transaction log belongs to a replay queue currently being processed, and if the transaction log belongs to the replay queue currently being processed, stores the transaction log in the replay queue, or if the transaction log does not belong to the replay queue currently being processed, creates a replay queue to store the transaction log.

In this example, transaction logs in a same group are stored in a same replay queue.

S1508: The replay module 1 determines whether the transaction log meets a replay condition, and if the transaction log meets the replay condition, performs replay in the destination end database based on the transaction log.

If the transaction log does not carry a number of another transaction log, the replay module 1 determines that the transaction log meets the replay condition. Alternatively, if the transaction log carries a number of another transaction log, and replay of the another transaction log has been completed, the replay module 1 determines that the transaction log meets the replay condition.

It should be noted that, if the replay module 1 determines that the transaction log depends on the another transaction log, the replay module 1 may wait for another replay module to send a replay result of the transaction log on which the transaction log depends. If the replay result is still not received within preset duration, the sending module may perform hash calculation based on a number of the transaction log on which the transaction log depends, to determine a replay module corresponding to the transaction log on which the transaction log depends, and send a query request to the replay module, where the query request is used to obtain the replay result. If the replay module 1 receives a response message that corresponds to the query request and that indicates that replay of the transaction log is completed, the replay module 1 performs replay in the destination end database based on the transaction log. If the replay module 1 receives a response message that corresponds to the query request and that indicates that replay of the transaction log is not completed, the replay module 1 continues to wait.

There is a case in which a replay module configured to replay the transaction log on which the transaction log depends is faulty. Therefore, the replay module 1 does not receive the reply message corresponding to the query request. In this case, the replay module 1 may determine that the replay module configured to replay the transaction log on which the transaction log depends is faulty, to send the case to a destination end management module. It should be noted that this case is not shown in FIG. 15A, FIG. 15B, and FIG. 15C.

S1509: The replay module 1 notifies another replay module of the replay result of the transaction log.

After receiving the replay result, the another replay module triggers replay of a subsequent transaction log. A specific process is similar to that in step S1508. Details are not described herein again. Each replay module repeatedly performs the steps performed by the replay module 1 until replay of all transaction logs is completed. When replay of a last transaction log received in the destination end device is completed, a replay module that completes replay of the last transaction log feeds back the replay result to the sending module and the another replay module. After determining that replay of the last transaction log is completed, the sending module may clear cache of the transaction log.

Figure 16:
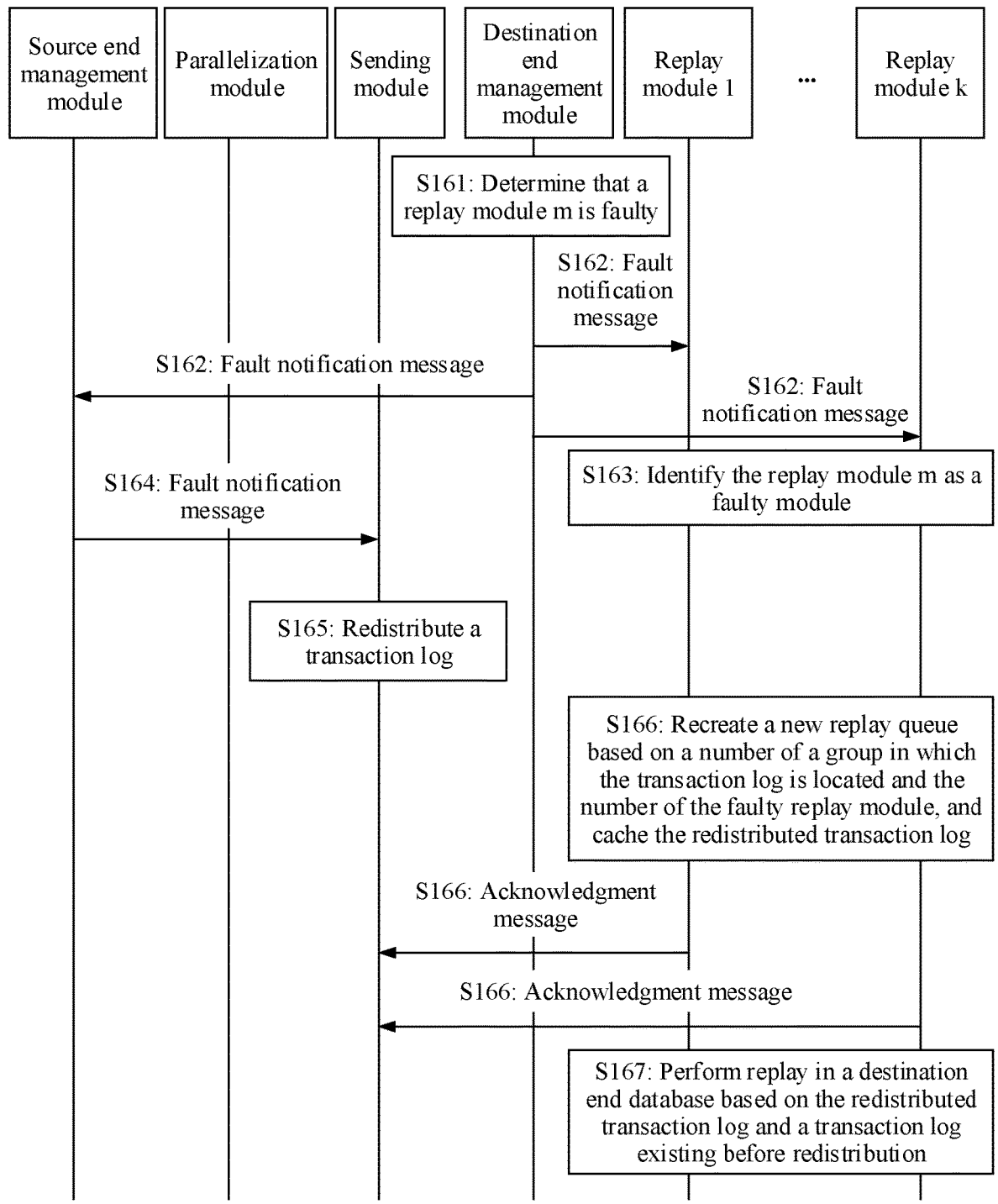
FIG. 16 is a flowchart of performing fault recovery by modules according to an embodiment of this application.

It can be learned from the example shown in FIG. 15A, FIG. 15B, and FIG. 15C that a fault may occur when the replay module performs replay based on the transaction log. In this embodiment of this application, fault recovery processing may be further performed by using a source end management module and the destination end management module, to ensure that replay of all transaction logs can be completed. FIG. 16 is a flowchart of performing fault recovery by modules. The flowchart is described as follows:

S161: A destination end management module determines that a replay module m is faulty.

A manner in which the destination end management module determines that the replay module m is faulty may include but is not limited to the following manners:

Determining Manner 1:

Each replay module may send a heartbeat to the destination end management module based on a preset period. If the destination end management module does not receive, within a period, a heartbeat sent by the replay module m, the destination end management module may determine that the replay module m is faulty.

Determining Manner 2:

Another replay module sends a query request to the replay module m, but does not obtain a response message from the replay module m, so that the another replay module reports the situation to the destination end management module. In this case, the destination end management module may determine that the replay module m is faulty.

Determining Manner 3:

The destination end management module may actively query a replay status of a destination end database, and determine a number of a last replayed transaction log in the destination end database. If the number of the last replayed transaction log is not a number of a last transaction log received by the destination end device, hash calculation is performed based on the found number of the last replayed transaction log, to learn that a hash calculation result is m. In this case, the destination end management module may determine that the replay module m is faulty.

Certainly, the destination end management module may alternatively determine, in another manner, that the replay module m is faulty. This is not limited herein.

S162: The destination end management module sends a fault notification message to a source end management module and each replay module.

The fault notification message may include a number of a faulty replay module, for example, m, and a number of a last replayed transaction log in the faulty replay module, for example, a transaction log n.

S163: Each replay module identifies the replay module m as a faulty module.

S164: The source end management module sends the fault notification message to each sending module.

S165: The sending module redistributes a transaction log.

After receiving the fault notification message, the sending module performs secondary hash calculation on a transaction log that has been distributed to the replay module m, and distributes the transaction log to another replay module. The redistributed transaction log may carry a "secondary hash redistribution" flag.

Because processing processes of sending modules are the same, one sending module is used as an example for description in FIG. 16.

S166: Each replay module recreates a new replay queue based on a number of a group in which the transaction log is located and the number of the faulty replay module, caches the redistributed transaction log, and feeds back an acknowledgment message to the sending module.

S167: Each replay module performs replay in the destination end database based on the redistributed transaction log and a transaction log existing before redistribution.

Each replay module may replay each transaction log in the destination end database in a manner same as the foregoing manner. Details are not described herein again. If a replay module receives a $1^{st}$ transaction log that carries a "secondary hash redistribution" flag, for example, receives a transaction log that carries a "secondary hash redistribution" flag and whose number is n, the replay module may immediately perform replay based on the transaction log.

After redistributing the transaction log that has been sent to the replay module m, the sending module sends another transaction log in a normal manner. Certainly, if it is determined that a transaction log needs to be distributed to the replay module m, the sending module still needs to perform secondary hash calculation on the transaction log, to distribute the transaction log to another replay module. Although the sending module performs secondary hash calculation, the replay module receives the transaction log for the first time. Therefore, in this case, the "secondary hash redistribution" flag does not need to be carried in the transaction log on which secondary hash calculation is performed.

In the foregoing embodiments provided in this application, to implement the functions in the method provided in the foregoing embodiments of this application, the storage system may include a hardware structure and/or a software module, to implement the foregoing functions by using the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In the embodiments shown in FIG. 3 to FIG. 11, division into the modules is an example and is merely logical function division, and may be another division in an actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 17:
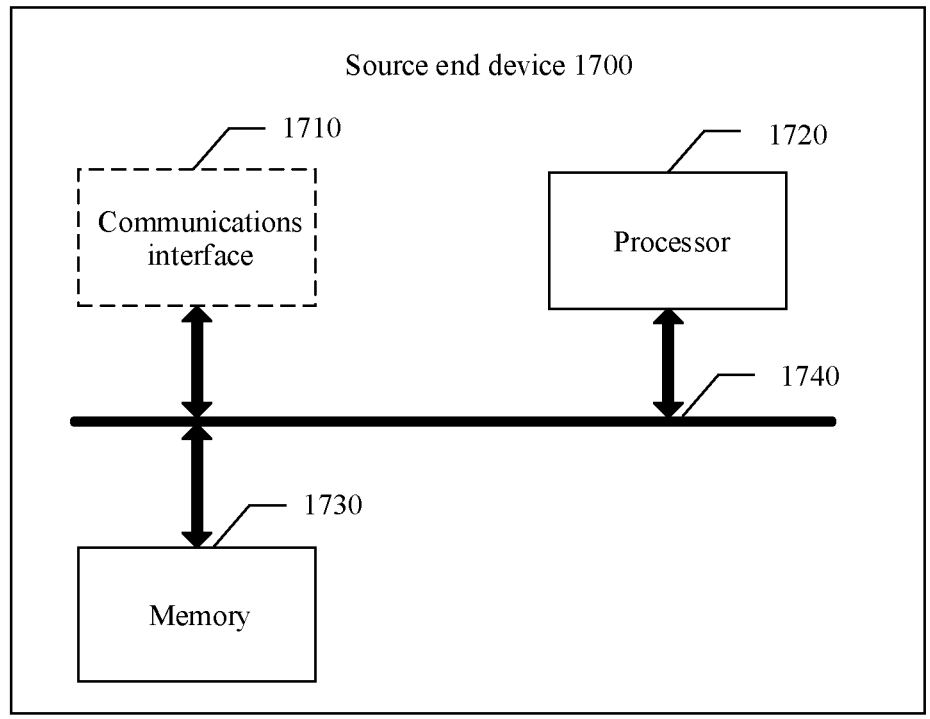
FIG. 17 is a schematic structural diagram of an example of a source end device according to an embodiment of this application.

FIG. 17 shows a source end device 1700 according to an embodiment of this application. The source end device 1700 may be a chip system. In this embodiment of this application, the chip system may include a chip, or may include a chip and another discrete component.

The source end device 1700 includes at least one processor 1720, configured to implement or support the source end device 1700 in implementing the functions of the source end device in the method provided in the embodiments of this application. For example, the processor 1720 may obtain at least two groups of transaction logs from a log file of a source end database in parallel. For details, refer to the detailed descriptions in the method example. The details are not described herein again.

The source end device 1700 may further include at least one memory 1730, configured to store program instructions and/or data. The memory 1730 is coupled to the processor 1720. Coupling in this embodiment of this application is an indirect coupling or a communication connection between apparatuses, units, or modules, may be in an electrical form, a mechanical form, or another form, and is used for information exchange between the apparatuses, the units, or the modules. The processor 1720 may cooperate with the memory 1730. The processor 1720 may execute the program instructions stored in the memory 1730. At least one of the at least one memory may be included in the processor.

The source end device 1700 may further include a communications interface 1710, configured to communicate with another device through a transmission medium, so that the source end device 1700 can communicate with the another device. For example, the another device may be a storage client or a storage device. The processor 1720 may send and receive data through the communications interface 1710.

A specific connection medium between the communications interface 1710, the processor 1720, and the memory 1730 is not limited in this embodiment of this application. In this embodiment of this application, the memory 1730, the processor 1720, and the communications interface 1710 are connected through a bus 1740 in FIG. 17. The bus is represented by using a thick line in FIG. 17. A manner of a connection between other components is merely an example for description, and is not limited thereto. The bus may be classified into an address bus, a data bus, a control bus, and the like. For ease of representation, only one thick line is used to represent the bus in FIG. 17, but this does not mean that there is only one bus or only one type of bus.

In this embodiment of this application, the processor 1720 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by using a hardware processor, or may be performed and completed by using a combination of hardware and software modules in the processor.

In this embodiment of this application, the memory 1730 may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store the program instructions and/or the data.

Figure 18:
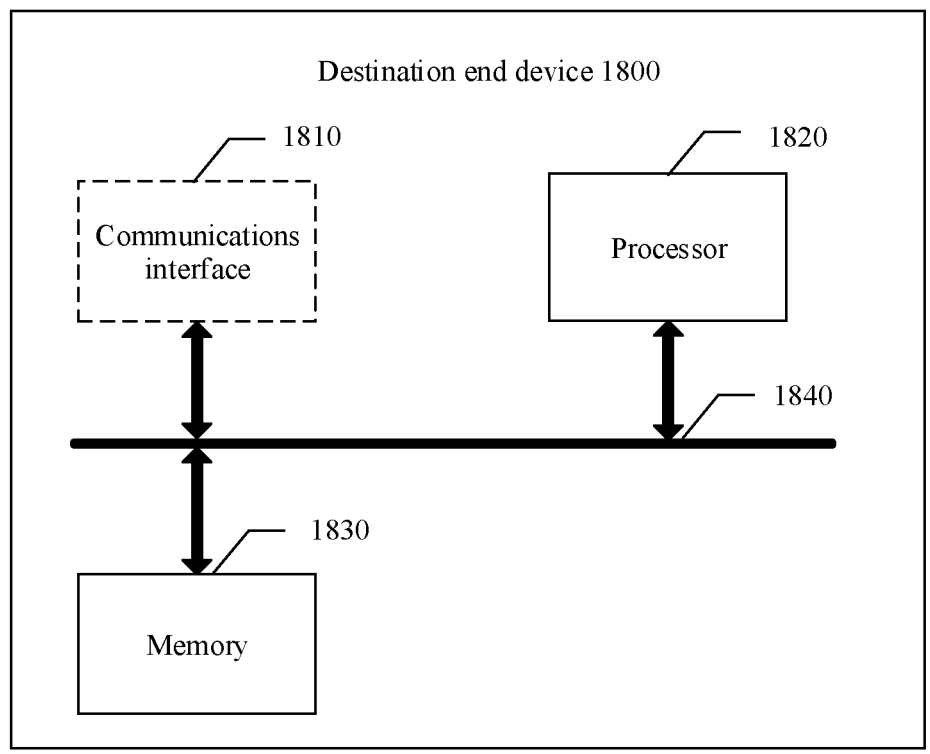
FIG. 18 is a schematic structural diagram of an example of a destination end device according to an embodiment of this application.

FIG. 18 shows a destination end device 1800 according to an embodiment of this application. The destination end device 1800 may be a chip system. In this embodiment of this application, the chip system may include a chip, or may include a chip and another discrete component.

The destination end device 1800 includes at least one processor 1820, configured to implement or support the destination end device 1800 in implementing the functions of the destination end device in the method provided in the embodiments of this application. For example, the processor 1820 may obtain at least two groups of transaction logs from a source end device, and perform transaction log replay in a destination end database based on the transaction logs. For details, refer to the detailed descriptions in the method example. The details are not described herein again.

The destination end device 1800 may further include at least one memory 1830, configured to store program instructions and/or data. The memory 1830 is coupled to the processor 1820. Coupling in this embodiment of this application is an indirect coupling or a communication connection between apparatuses, units, or modules, may be in an electrical form, a mechanical form, or another form, and is used for information exchange between the apparatuses, the units, or the modules. The processor 1820 may cooperate with the memory 1830. The processor 1820 may execute the program instructions stored in the memory 1830. At least one of the at least one memory may be included in the processor.

The destination end device 1800 may further include a communications interface 1810, configured to communicate with another device through a transmission medium, so that the destination end device 1800 can communicate with the another device. For example, the another device may be a storage client or a storage device. The processor 1820 may send and receive data through the communications interface 1810.

A specific connection medium between the communications interface 1810, the processor 1820, and the memory 1830 is not limited in this embodiment of this application. In this embodiment of this application, the memory 1830, the processor 1820, and the communications interface 1810 are connected through a bus 1840 in FIG. 18. The bus is represented by using a thick line in FIG. 18. A manner of a connection between other components is merely an example for description, and is not limited thereto. The bus may be classified into an address bus, a data bus, a control bus, and the like. For ease of representation, only one thick line is used to represent the bus in FIG. 18, but this does not mean that there is only one bus or only one type of bus.

In this embodiment of this application, the processor 1820 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by using a hardware processor, or may be performed and completed by using a combination of hardware and software modules in the processor.

In this embodiment of this application, the memory 1830 may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store the program instructions and/or the data.

An embodiment of this application further provides a computer-readable storage medium, including instructions. When the instructions are run on a computer, the computer is enabled to perform the methods performed by the source end device and the destination end device in the embodiments shown in FIG. 12 to FIG. 16.

An embodiment of this application further provides a computer program product, including instructions. When the computer program product runs on a computer, the computer is enabled to perform the methods performed by the server in the embodiments shown in FIG. 12 to FIG. 16.

An embodiment of this application provides a chip system. The chip system includes a processor, may further include a memory, and is configured to implement the functions of the source end device or the destination end device in the foregoing methods. The chip system may include a chip, or may include a chip and another discrete component.

All or some of the methods in the embodiments of this application may be implemented by using software, hardware, firmware, or any combination thereof. When software is used to implement the methods, all or some of the methods may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

What is claimed is:

1. A database replication system comprising:
   a source end device; and
   a destination end device,
   wherein the source end device is configured to:
   obtain at least two groups of transaction logs from a log file of a source end database in parallel, wherein the at least two groups of transaction logs comprise a first group of transaction logs and a second group of transaction logs, the first group of transaction logs comprises at least a first transaction log and a second transaction log that are adjacent to each other, the second group of transaction logs comprises at least a third transaction log and a fourth transaction log that are adjacent to each other, and a generation time point of the second transaction log is earlier than a generation time point of the third transaction log; and
   send the at least two groups of transaction logs to the destination end device;
   wherein the destination end device is configured to:
   receive the at least two groups of transaction logs from the source end device;
   perform transaction replay in the destination end database based on the first transaction log, the second transaction log, and a dependency relationship between the first transaction log and the second transaction log that are in the first group of transaction logs; and
   perform transaction replay in the destination end database based on the third transaction log, the fourth transaction log, and a dependency relationship between the third transaction log and the fourth transaction log that are in the second group of transaction logs, such that data stored in the destination end database is the same as data stored in the source end database.

2. The database replication system according to claim 1, wherein the source end device is further configured to:
   record a number of the first transaction log in the second transaction log when determining that an operation object of a first transaction operation recorded in the first transaction log in the source end database is same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, wherein the number of the first transaction log indicates the dependency relationship between the first transaction log and the second transaction log; and
   record a number of the third transaction log in the fourth transaction log when determining that an operation object of a third transaction operation recorded in the third transaction log in the source end database is same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, wherein the number of the third transaction log indicates the dependency relationship between the third transaction log and the fourth transaction log.

3. The database replication system according to claim 1, wherein the destination end device is further configured to:
   record a number of the first transaction log in the second transaction log when determining that an operation object of a first transaction operation recorded in the first transaction log in the source end database is same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, wherein the number of the first transaction log indicates the dependency relationship between the first transaction log and the second transaction log; and
   record a number of the third transaction log in the fourth transaction log when determining that an operation object of a third transaction operation recorded in the third transaction log in the source end database is same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, wherein the number of the third transaction log indicates the dependency relationship between the third transaction log and the fourth transaction log.

4. The database replication system according to claim 2, wherein the destination end device is configured to:
   determine that the second transaction log records the number that is of the first transaction log and indicates the dependency relationship between the first transaction log and the second transaction log; and
   after determining that transaction replay performed based on the first transaction log is completed, perform transaction replay based on the second transaction log.

5. The database replication system according to claim 2, wherein the destination end device is configured to:
   determine that the first transaction log does not record a number that is of a transaction log and indicates that there is a dependency relationship with the first transaction log; and perform transaction replay based on the first transaction log.

6. The database replication system according to claim 2, wherein the destination end device is configured to:
   determine that the fourth transaction log records the number that is of the third transaction log and that is used to indicate the dependency relationship between the fourth transaction log and the third transaction log, and after determining that transaction replay performed based on the third transaction log is completed, performs transaction replay based on the fourth transaction log.

7. The database replication system according to claim 2, wherein
   the destination end device determines that the third transaction log does not record a number that is of a transaction log and that is used to indicate that there is a dependency relationship with the third transaction log, and performs transaction replay based on the third transaction log.

8. The database replication system according to claim 1, wherein the source end device and the source end database are disposed in a first area, the destination end device and the destination end database are disposed in a second area remotely connected to the first area.

9. The database replication system according to claim 1, wherein the source end device is configured to obtain the at least two groups of transaction logs from the source end database in parallel based on a number range of transaction logs.

10. The database replication system according to claim 9, wherein the source end device is further configured to:
    read log summary record information from the source end database, wherein the log summary record information records a number of a transaction log generated by the source end database, a recording location and a length that are of the transaction log in the log file, and a quantity of transaction logs in the log file, and
    wherein the source end device is configured to obtain the at least two groups of transaction logs from the log file in parallel based on the log summary record information.

11. A database replication method performed by a destination end device, comprising:
    receiving at least two groups of transaction logs from a source end device, wherein the at least two groups of transaction logs comprise a first group of transaction logs and a second group of transaction logs, the first group of transaction logs comprises at least a first transaction log and a second transaction log that are adjacent to each other, the second group of transaction logs comprises at least a third transaction log and a fourth transaction log that are adjacent to each other, and a generation time point of the second transaction log is earlier than a generation time point of the third transaction log;
    performing transaction replay in a destination end database based on the first transaction log, the second transaction log, and a dependency relationship between the first transaction log and the second transaction log that are in the first group of transaction logs; and
    performing transaction replay in the destination end database based on the third transaction log, the fourth transaction log, and a dependency relationship between the third transaction log and the fourth transaction log that are in the second group of transaction logs, such that data stored in the destination end database is same as data stored in a source end database.

12. The method according to claim 11, further comprising:
    recording a number of the first transaction log in the second transaction log when determining that an operation object of a first transaction operation recorded in the first transaction log in the source end database is same as an operation object of a second transaction operation recorded in the second transaction log in the source end database, and an operation moment of the first transaction operation recorded in the first transaction log in the source end database is earlier than an operation moment of the second transaction operation recorded in the second transaction log in the source end database, wherein the number of the first transaction log indicates the dependency relationship between the first transaction log and the second transaction log; and
    recording a number of the third transaction log in the fourth transaction log when determining that an operation object of a third transaction operation recorded in the third transaction log in the source end database is same as an operation object of a fourth transaction operation recorded in the fourth transaction log in the source end database, and an operation moment of the third transaction operation recorded in the third transaction log in the source end database is earlier than an operation moment of the fourth transaction operation recorded in the fourth transaction log in the source end database, wherein the number of the third transaction log indicates the dependency relationship between the third transaction log and the fourth transaction log.

13. The method according to claim 11, wherein the step of performing transaction replay in the destination end database based on the first transaction log, the second transaction log, and the dependency relationship between the first transaction log and the second transaction log comprises:
    determining that the first transaction log does not record a number that is of a transaction log and indicates that there is a dependency relationship with the first transaction log; and
    performing transaction replay based on the first transaction log.

14. The method according to claim 11, wherein the step of performing transaction replay in a destination end database based on the first transaction log, the second transaction log, and the dependency relationship between the first transaction log and the second transaction log comprises:
    determining that the second transaction log records the number that is of the first transaction log and indicates the dependency relationship between the first transaction log and the second transaction log; and
    after determining that transaction replay performed based on the first transaction log is completed, performing transaction replay based on the second transaction log.

15. The method according to claim 11, wherein the step of performing transaction replay in the destination end database based on the third transaction log, the fourth transaction log, and a dependency relationship between the third transaction log and the fourth transaction log comprises:
    determining that the third transaction log does not record a number that is of a transaction log and indicates that there is a dependency relationship with the third transaction log; and
    performing transaction replay based on the third transaction log.

16. The method according to claim 11, wherein the step of performing transaction replay in the destination end database based on the third transaction log, the fourth transaction log, and the dependency relationship between the third transaction log and the fourth transaction log comprises:
    determining that the fourth transaction log records the number that is of the third transaction log and indicates the dependency relationship between the fourth transaction log and the third transaction log; and
    after determining that transaction replay performed based on the third transaction log is completed, performing transaction replay based on the fourth transaction log.

\* \* \* \* \*